United States Patent [19]

Shores

[11] Patent Number: 5,267,138
[45] Date of Patent: Nov. 30, 1993

[54] DRIVING AND CLAMPING POWER REGULATION TECHNIQUE FOR CONTINUOUS, IN-PHASE, FULL-DURATION, SWITCH-MODE RESONANT CONVERTER POWER SUPPLY

[75] Inventor: Ronald B. Shores, Denver, Colo.

[73] Assignee: Creos International Ltd., Fife, Scotland

[21] Appl. No.: 855,654

[22] Filed: Mar. 23, 1992

[51] Int. Cl.$^5$ .......................................... H02M 3/335
[52] U.S. Cl. ...................................... 363/98; 363/17; 363/95; 363/132; 378/112
[58] Field of Search ...................... 363/15, 16, 17, 95, 363/98, 131, 132; 378/101, 111, 112

[56] References Cited

U.S. PATENT DOCUMENTS

| Re. 33,866 | 3/1992 | Schutten et al. | 363/98 |
|---|---|---|---|
| 4,216,382 | 8/1980 | Franke | 250/408 |
| 4,317,039 | 2/1982 | Romandi | 250/418 |
| 4,679,129 | 7/1987 | Sakakibara et al. | 363/98 |
| 4,680,693 | 7/1987 | Carron | 363/17 |
| 4,727,874 | 3/1988 | Bowers et al. | 128/303.13 |
| 4,855,888 | 8/1989 | Henze et al. | 363/98 |
| 4,860,184 | 8/1989 | Tabisz et al. | 363/132 |
| 4,864,483 | 9/1989 | Divan | 363/132 |
| 4,868,728 | 9/1989 | Nuns | 363/132 |
| 4,876,635 | 10/1989 | Park et al. | 363/17 |
| 4,914,558 | 4/1990 | Flickinger | 363/132 |
| 4,992,919 | 2/1991 | Lee et al. | 363/17 |
| 5,121,314 | 6/1992 | Cathell et al. | 363/17 |
| 5,132,889 | 7/1992 | Hitchcock et al. | 363/132 |
| 5,157,593 | 10/1992 | Jain | 363/17 |
| 5,166,965 | 11/1992 | Collier | 363/68 |
| 5,172,309 | 12/1992 | DeDoncker et al. | 363/132 |

OTHER PUBLICATIONS

Brochure, Creos.120, Creos Delivers Power, published by Applicant, Dec. 1989.
Evolution to Revolution: The Introduction of True, 100 KHZ High Frequency X-Ray and Advanced Anatomical Programmability, Yochum, The American Chiropractor, Sep. 1990.
Practical resonant power converters—theory and application, Part II—the resonant switch concept, Todd and Lutz, Powertechnics Magazine, May 1986.

Primary Examiner—Jeffrey Sterrett
Attorney, Agent, or Firm—John R. Ley

[57] ABSTRACT

A converter power supply uses a resonant primary circuit connected to a transformer and switches driving current pulses to the resonant primary circuit in phase with and substantially over the duration of the positive and negative half cycles during drive conditions, and clamps to allow the natural resonant current to decay in magnitude substantially over the duration of the positive and negative half cycles during clamping conditions. The decisions to drive or to clamp are made on half-cycle of the naturally resonating current. An algorithmic relationship creates the maximum alternation of drive and clamp conditions to achieve the desired level of power regulation. A configuration of current switches drives the primary winding and charges a resonator capacitor during one half cycle of the resonant current, and during the other half cycle the capacitor is discharged to drive in the other direction. The power supply is particularly useful for energizing an x-ray tube.

69 Claims, 10 Drawing Sheets

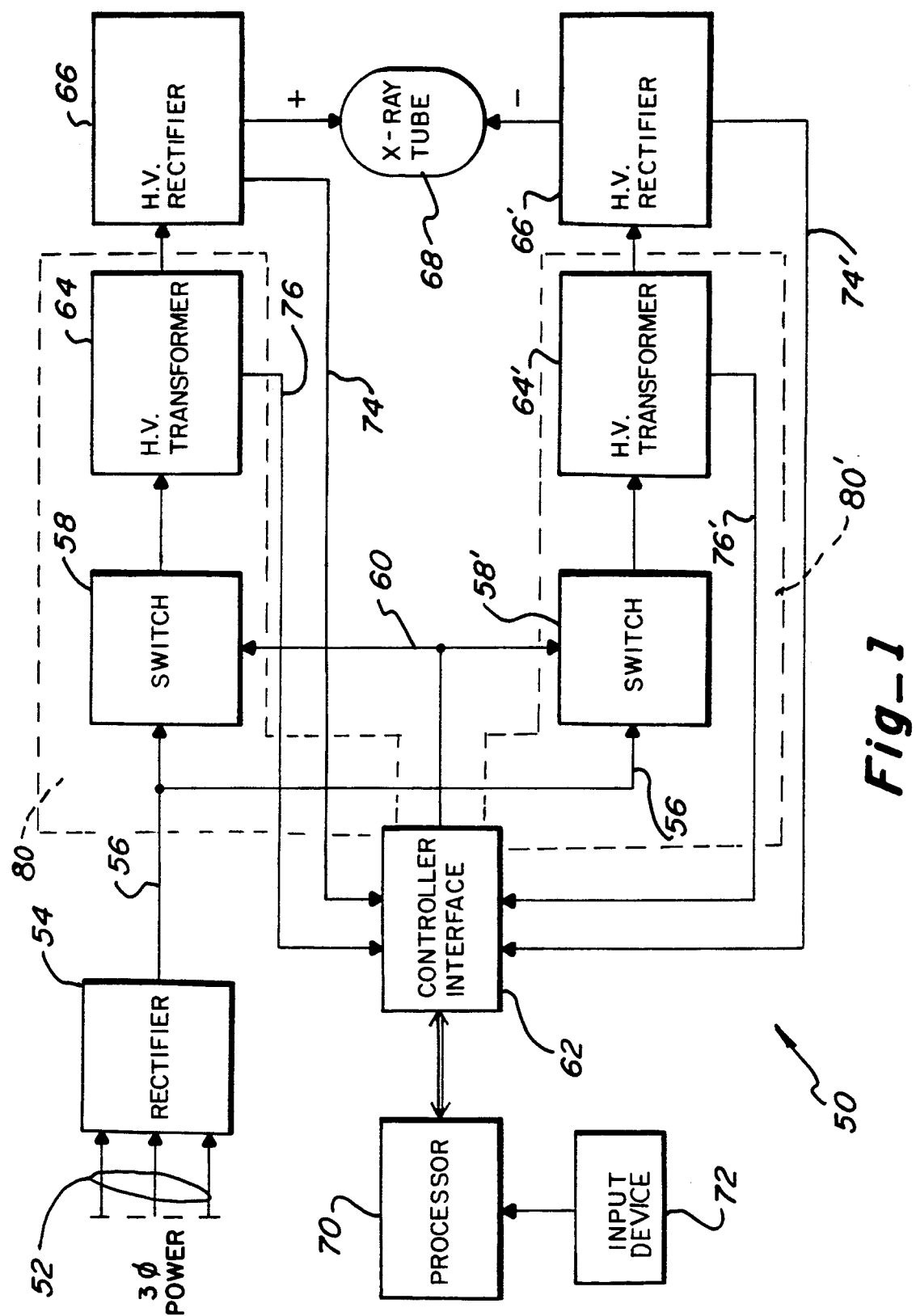
Fig_1

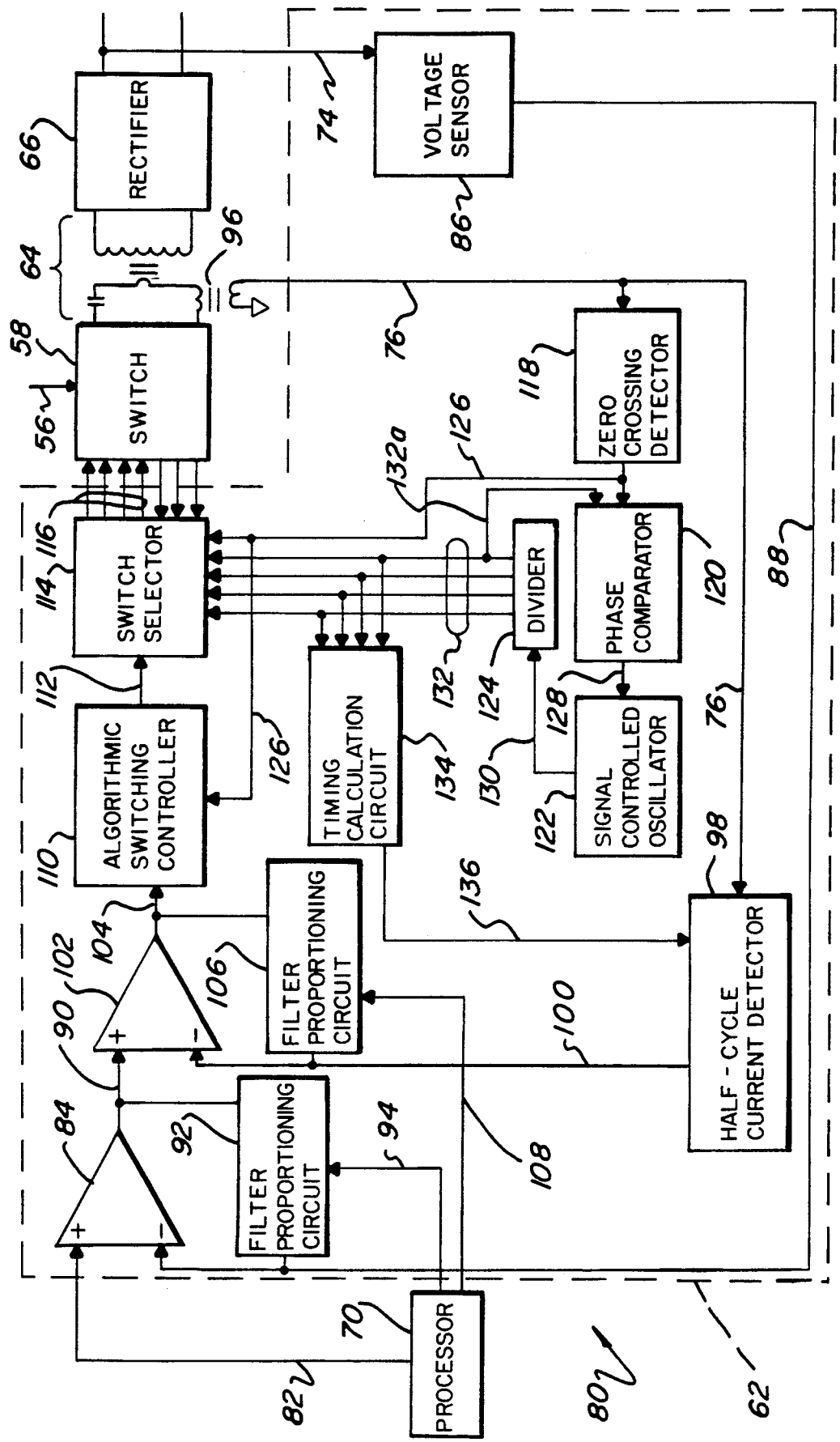
Fig_2

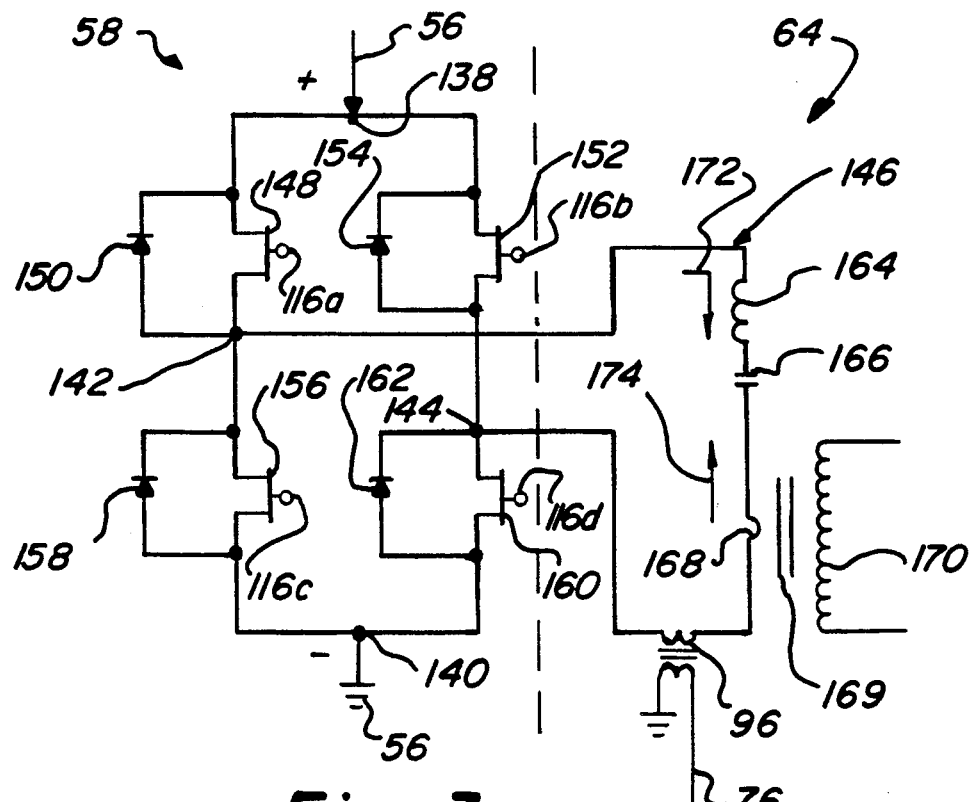
Fig_3
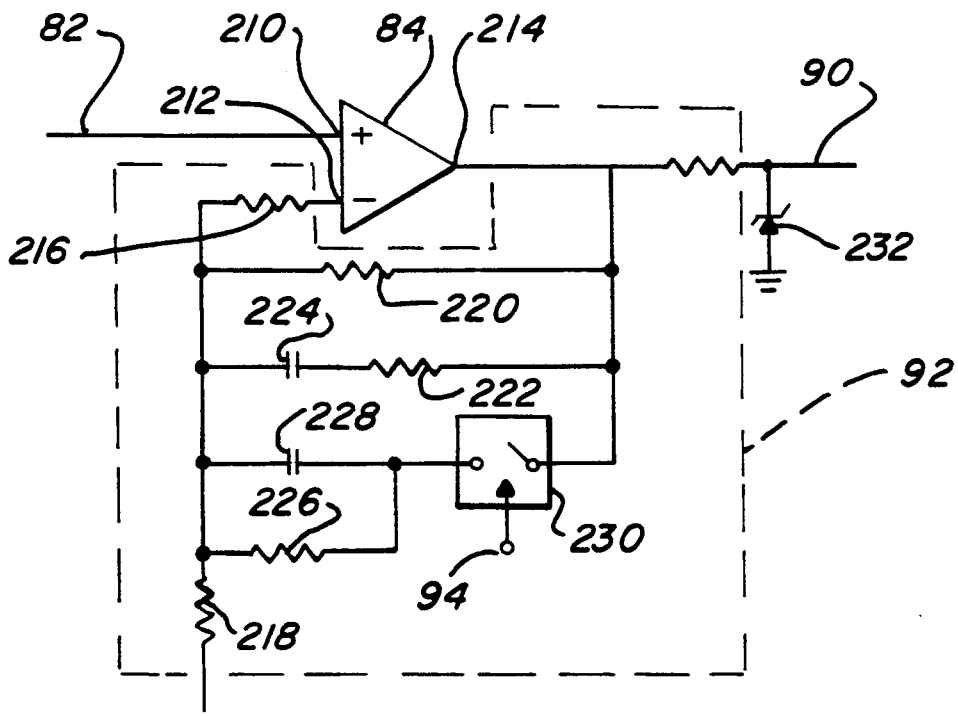
Fig_7

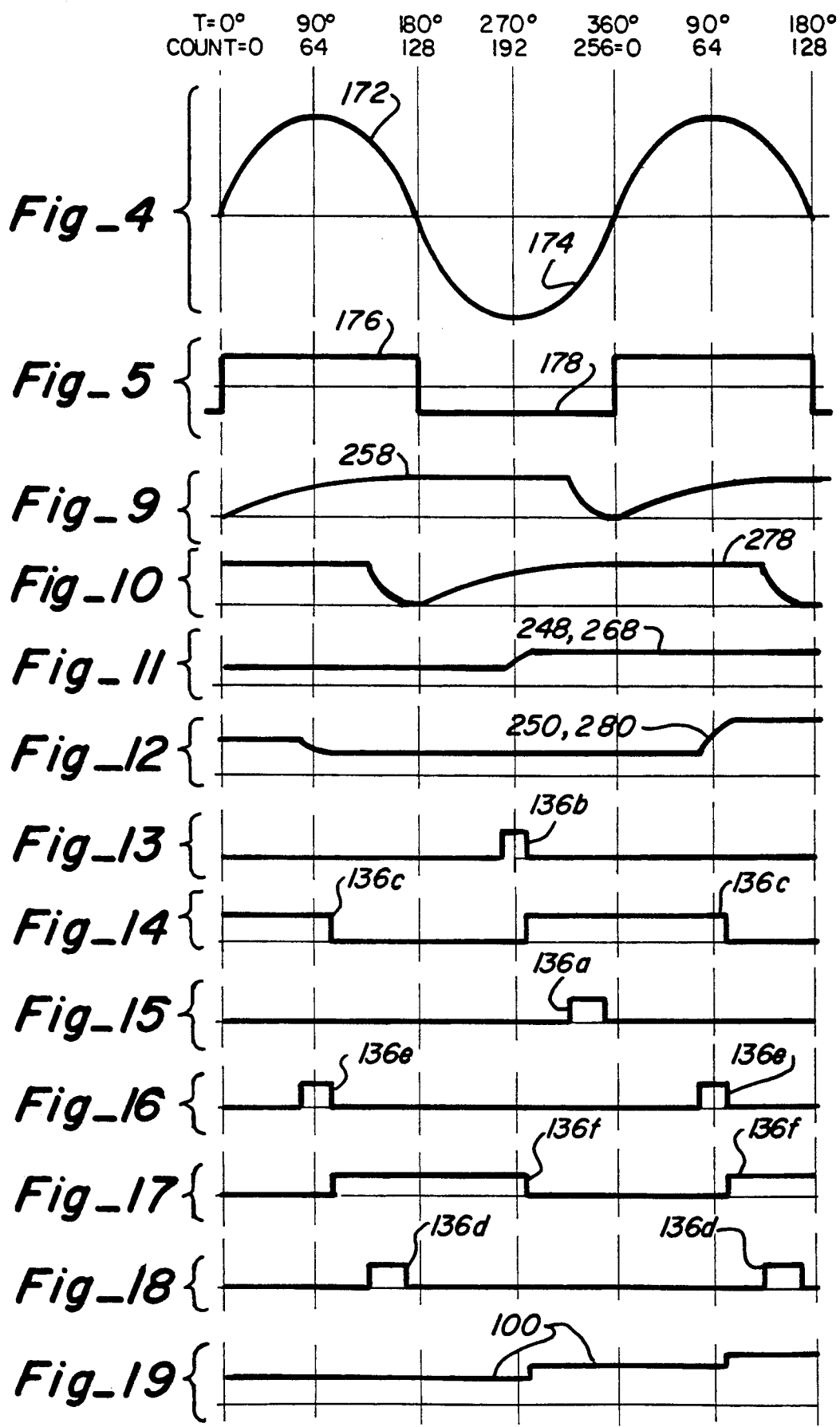

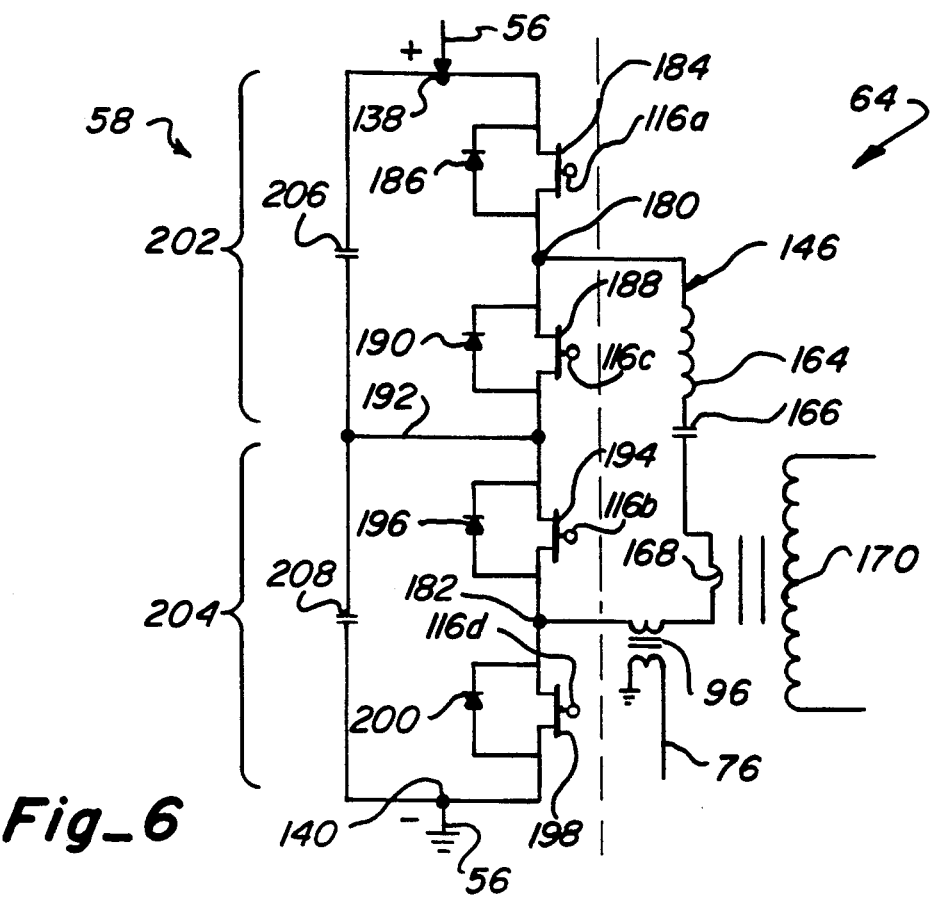
Fig_6
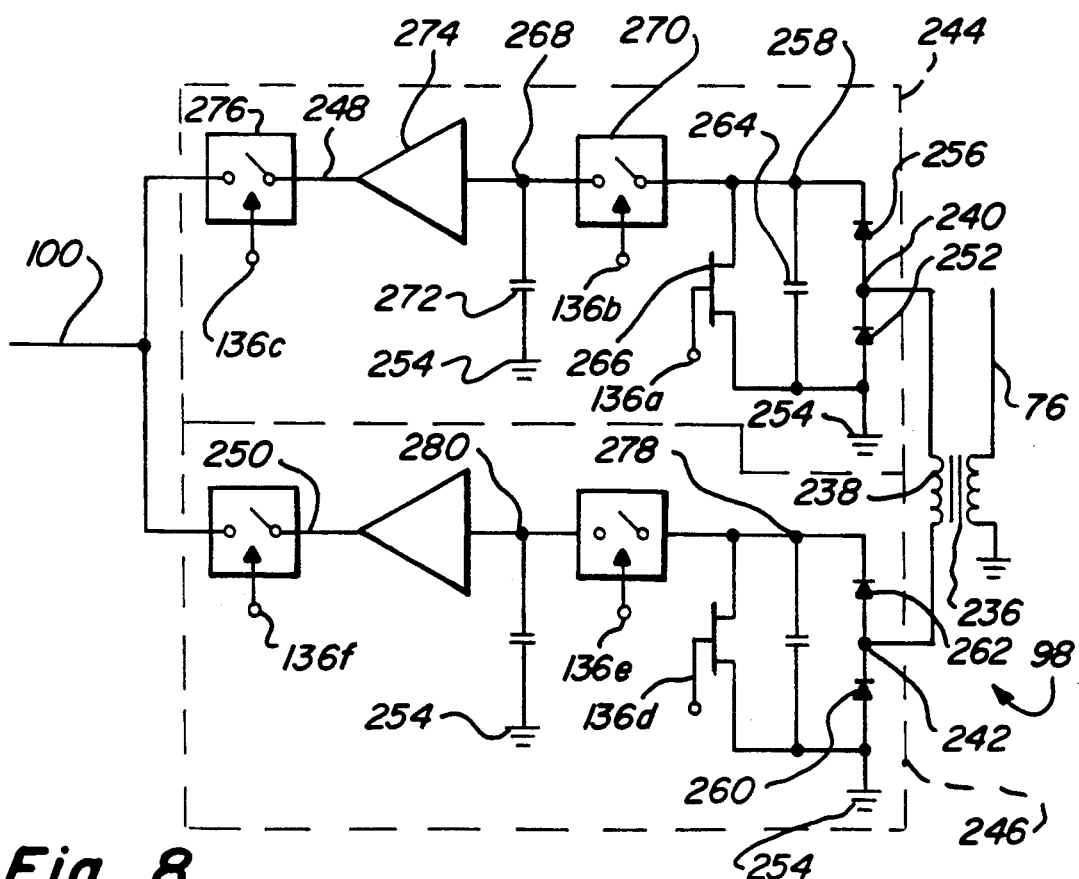
Fig_8

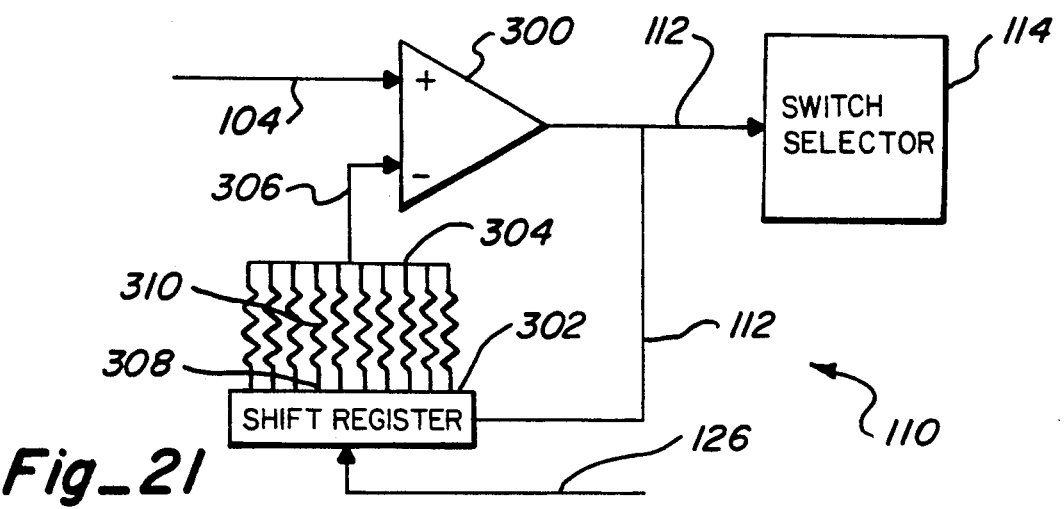
Fig_21
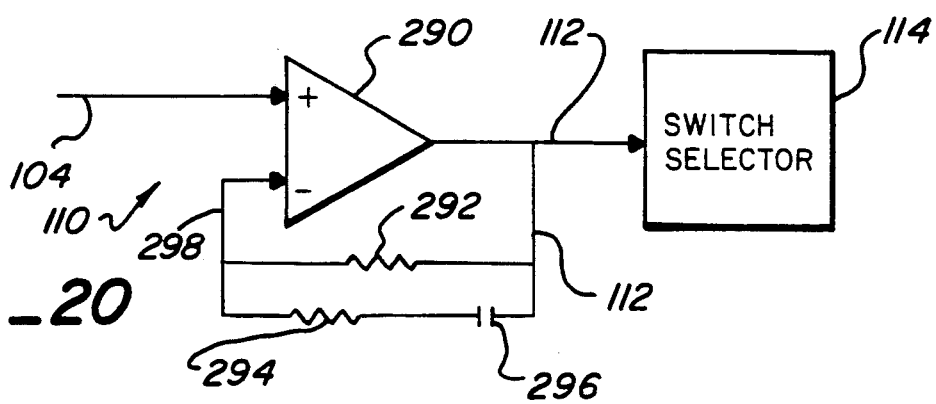
Fig_20
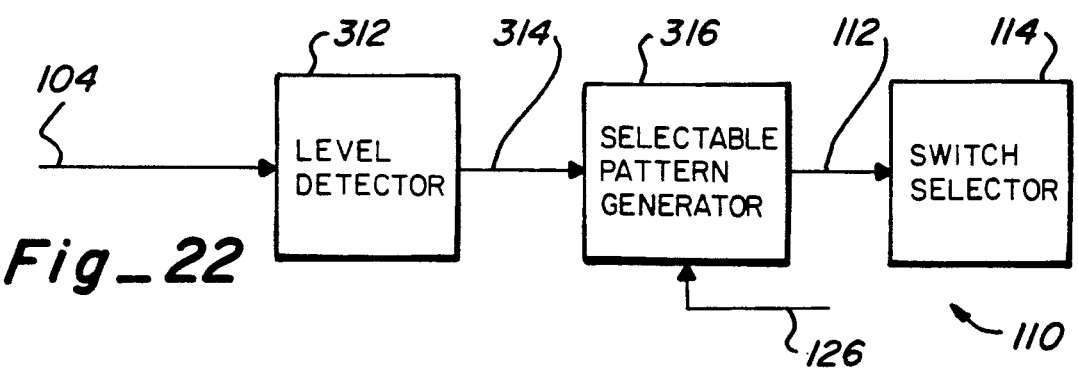
Fig_22
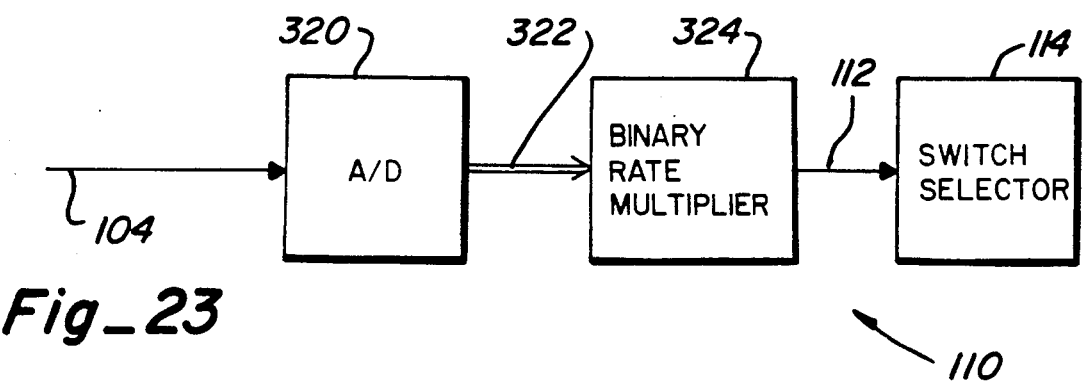
Fig_23

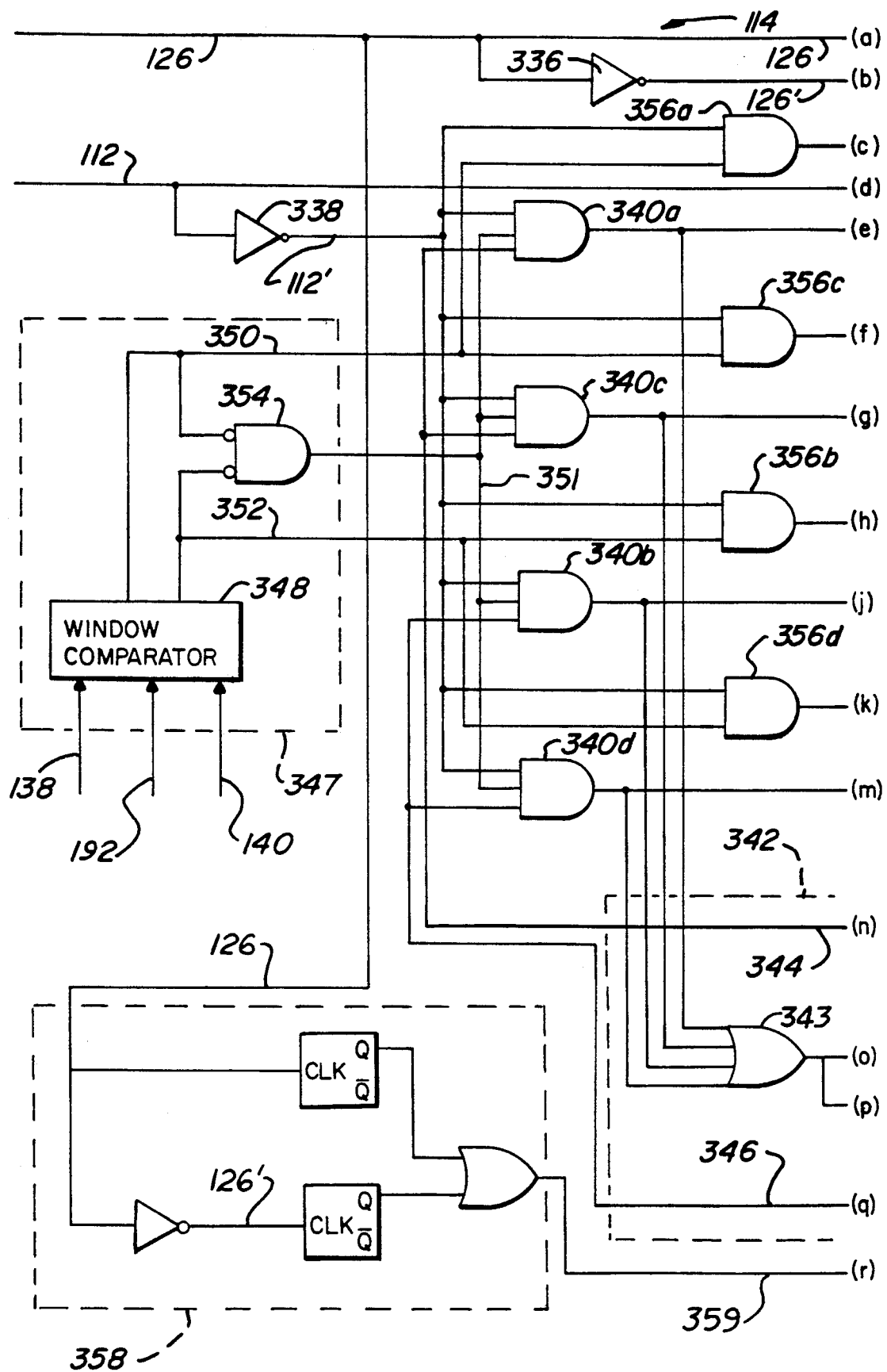
Fig_24A

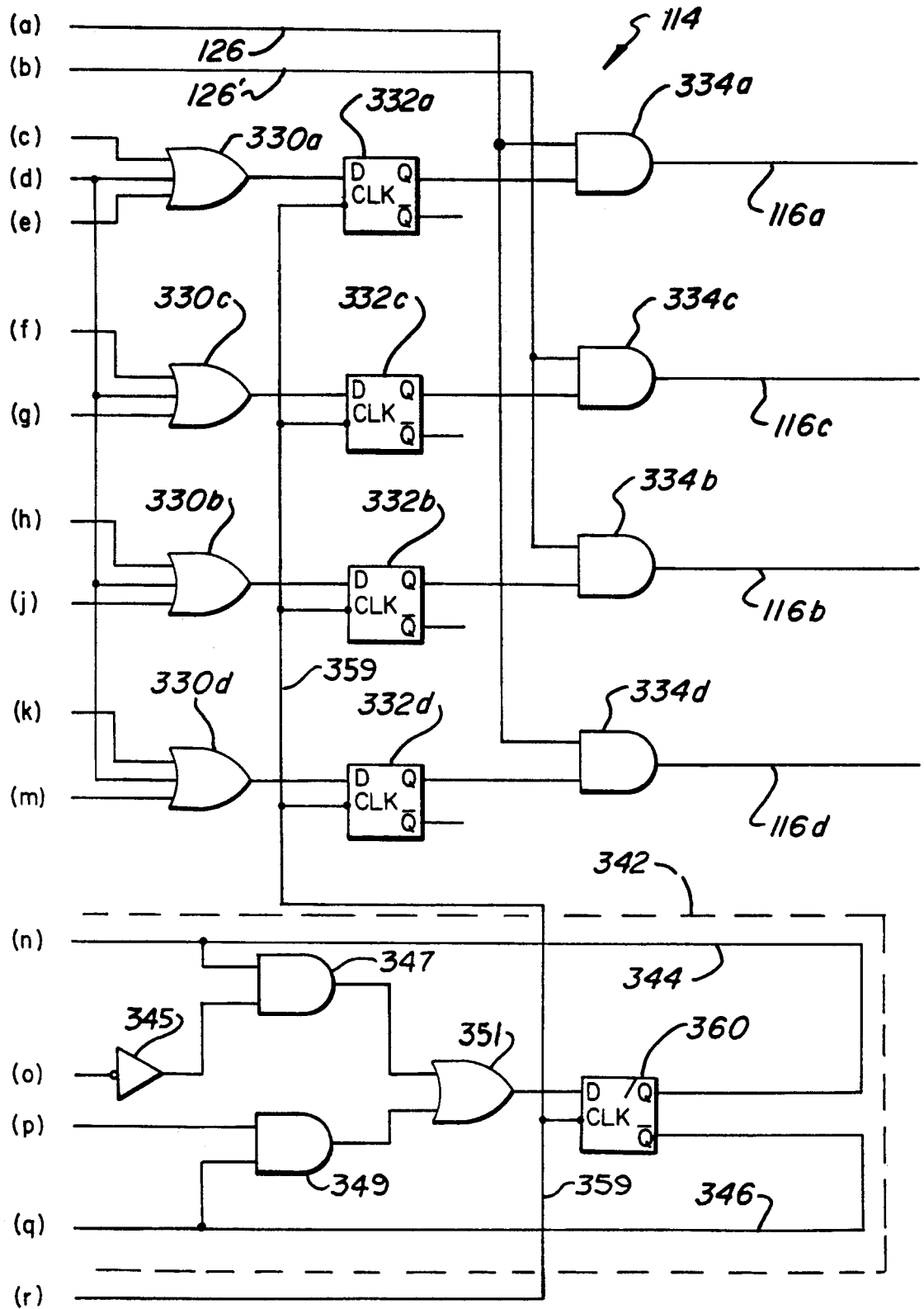
Fig_24B

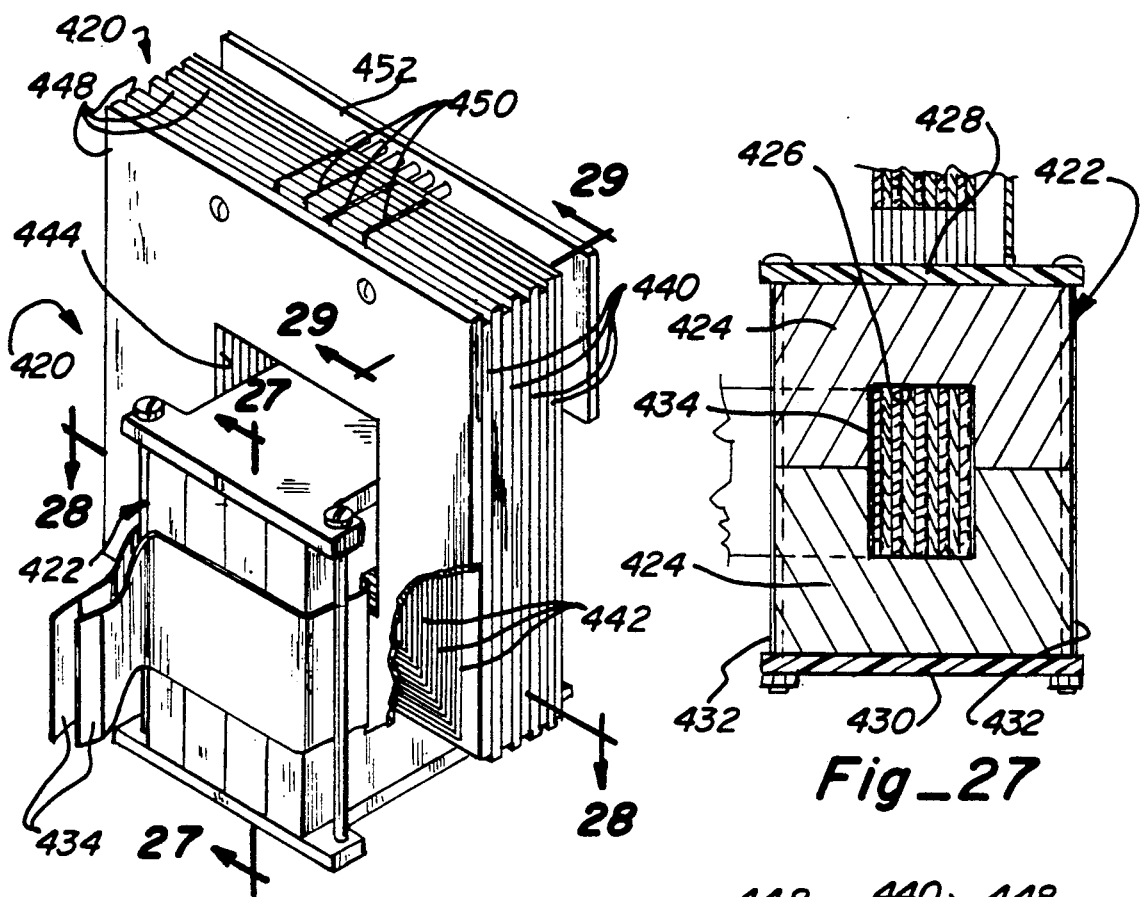
Fig_26
Fig_27
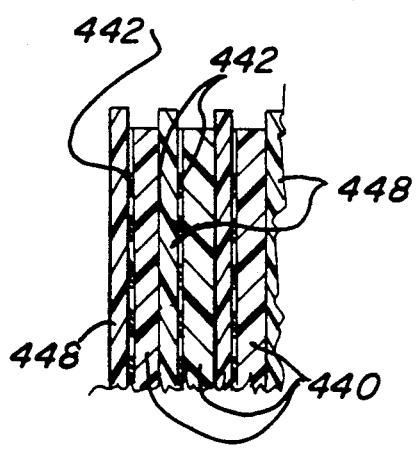
Fig_29
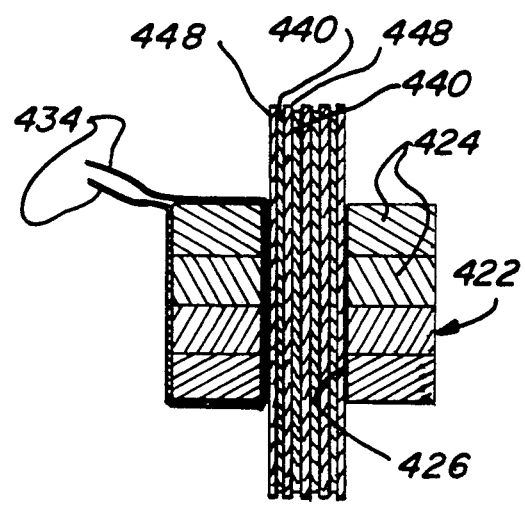
Fig_28

DRIVING AND CLAMPING POWER REGULATION TECHNIQUE FOR CONTINUOUS, IN-PHASE, FULL-DURATION, SWITCH-MODE RESONANT CONVERTER POWER SUPPLY

This invention relates to power supplies, and more particularly to a new and improved continuous, in-phase, switched-mode resonant converter power supply. Even more particularly the present invention relates to improvements in a high voltage power supply for an x-ray device.

BACKGROUND OF THE INVENTION

A power supply is generally regarded as an electrical device which converts electrical power of one characteristic to electrical power of another characteristic. Power supplies are typically used to convert commercially available alternating current (AC) power to direct current (DC) power, and to convert DC power to AC power. Sometimes, a power supply will perform two or more conversions to obtain the desired level or characteristic of electrical power. Conversions such as these may be desirable or necessary for a wide variety of reasons, most of which are well known and appreciated and many of which are made desirable because of the characteristics of the particular device which is to be powered. Furthermore, many of the operational concepts of power supplies are well known, and it is improvements to these operational concepts to which the present invention pertains.

One type of converter is a resonant converter. A resonant converter employs a resonant circuit formed by capacitive and inductive elements in the primary winding circuit of a power transformer. Current in the resonant primary winding circuit alternates at a natural frequency established by the values of its capacitance and inductance. The primary winding current induces a flux in the transformer which alternates at the same frequency as the natural resonant frequency of the primary winding current. The flux causes the secondary winding circuit of the transformer to produce voltage and current which alternates at the same frequency as the primary winding current. The output voltage and current from the transformer are established by the ratio of the number of primary and secondary windings of the transformer. The energy supplied to the resonant primary circuit is ultimately converted to electrical output power, with some power consumed by losses. The energy conversion and parasitic losses cause the primary resonant current to decay, thus requiring the resonant primary circuit to be re-energized.

Resonant converters are of a continuous or discontinuous type, depending upon the manner in which the resonant primary circuit is re-energized. A continuous resonant converter continually supplies re-energizing current to the resonant primary circuit. As a consequence, the current in the resonant primary circuit is varied only enough to obtain the degree of regulation desired, without decaying or fluctuating substantially.

A discontinuous resonant converter intermittently switches DC current to the resonant primary circuit to re-energize it. In general, discontinuous resonant converters do not re-energize the resonant primary circuit in complete coincidence with or in phase with the electrical current resonating in the primary winding, because the naturally alternating current decays substantially or completely before the primary circuit is re-energized. The power delivery characteristics of the discontinuous converter are regulated by controlling the time duration between the intermittent intervals of power delivery to the resonant primary circuit. When more output power is desired, the time between intermittent energy delivery to the resonant primary circuit is decreased, and vice versa.

Discontinuous resonant converters are not preferred in situations where a high degree of precision in regulating the output power level is required or desired. The intermittent nature of the operation of the discontinuous resonant converter results in relatively significant changes in the instantaneous power delivered over time, thus making the highest degree of regulation impossible or difficult. In those cases where a discontinuous resonant converter is used and a relatively high degree of power delivery is required on a continual basis, the output AC power is generally converted to DC power by a rectifier and storage capacitors. The storage capacitors are usually of a considerable size to absorb and compensate for the significant fluctuations in power delivery from the discontinuous resonant converter. Furthermore, the size of the transformer and the current switches supplying current to the resonant primary circuit are of a greater capacity and thus more costly because they must deliver relatively greater quantities of power over relatively shorter time periods.

Since continuous resonant converters offer the capability of achieving a more uniform power delivery on a continuous basis, the size and cost of the components can be reduced. However, most of these considerations have been recognized only in theory because the practical difficulties of implementing continuous resonant converters have been substantial. One of the significant difficulties has been the regulation of power. It has been very difficult to add energy to or remove energy from the resonant primary circuit on a sufficiently responsive and precise basis to obtain a relative high degree of control over the output power.

One theoretical approach to reducing power in a continuous resonant converter is to switch current in opposition to the current naturally oscillating in the primary winding. The opposing current reduces the magnitude of the primary circuit current and thus reduces the power output. Another approach is to switch current at a frequency which is slightly different than the natural frequency. Because the switched current is slightly out of phase with the naturally alternating current, the resonant effects of the resonant primary circuit decay, resulting in a corresponding reduction in output power. The practical difficulty with both approaches of power reduction is that the phase difference between the switched current and the naturally oscillating current requires the current switches to absorb significant amounts of power during switching. The power absorbing requirement is so substantial that there is a risk of destroying the switches.

Since a well regulated power supply is continually increasing and decreasing power output to achieve adequate power regulation, the problems in power absorption have been significant impediments to the successful implementation of continuous resonant converters. Because of these limitations, pulse width modulated (PWM) driver circuits are frequently usually used to drive the primary winding of the power transformer, rather than a resonant circuit. In PWM power supplies, the amount of current supplied by the switches of the PWM driver is more easily controlled.

Another difficulty with continuous resonant converters is the capability of quickly regulating the quantity of current switched to the primary resonant current. Since the efficiency of power transfer is increased at higher operating frequencies, due to the better coupling of the flux between the primary and secondary windings in practical transformers at the higher frequencies, the operating frequency of high efficiency power supplies is generally very high, for example up to 100 kHz. While high-power, relatively-fast-operating, transistor current switches, such as metal oxide semiconductor field effect transistors (MOS-FETs), are capable of switching sufficient current at the relatively high frequencies, it is considerably more difficult to obtain sufficiently responsive control signals by which to control the current switches. The control signals are usually feedback signals which are derived by comparing a signal representative of an output characteristic, such a voltage or current, with a predetermined signal representative of a desired amount of the output characteristic. There is an inherent lag time between the response of the power supply and the determination that an output condition should be corrected. A reduced lag time response is desirable because it results in a higher degree of precision in regulation, which is desired or required in many applications.

One particularly demanding application for a power supply is controlling an x-ray tube in an x-ray device. The x-ray power supply must have the capability to adjust the level of output voltage to assure the best quality image for the particular type of body part being imaged. Higher voltages are required for x-raying more dense body parts such a bone, and lower voltages may be used adequately for x-raying soft tissues such as organs.

The quality of an x-ray image is directly related to the precision of regulation and the level of voltage applied to the x-ray tube. Higher applied voltages cause the x-ray tube to emit greater quantities of "hard" or high energy radiation. The hard radiation causes a good image by increasing the contrast with less exposure time. Minimum exposure times are desirable to reduce the potentially damaging effect of x-rays on the human body. Lower applied voltages generate levels of "soft" radiation which is of little assistance in creating a good image but adds to the total exposure time. Establishing and maintaining the desired level of output voltage obtains the best quality of image and the minimum amount of exposure time for each particular application.

An x-ray power supply must rapidly change or adjust the output voltage in short times. Most x-ray tubes are triggered by rapidly increasing the voltage across the x-ray tube from a level where no radiation is emitted, to a level where the x-ray tube is triggered into conduction. Conductivity of the x-ray tube is terminated by rapidly decreasing the voltage. The increase in voltage to trigger the x-ray tube and the decrease in voltage to terminate the emission of radiation should occur as rapid as possible, to minimize the emission of soft radiation and to control the exposure time more precisely. The high voltages applied to the x-ray tube, for example 150,000 volts, may cause undesired arcing across the x-ray tube. Arcing conditions can dissipate an explosive amount of energy and degrade the x-ray tube. Under arcing conditions it is desirable to almost instantaneously terminate the supply of output voltage.

The x-ray power supply should also have a capability to respond rapidly and effectively to maintain the output voltage level as close as possible to the desired level. Maintaining the voltage at the desired level avoids ripple and fluctuations in voltage which could vary the quality of the image and possibly result in the emission undesirable quantities of soft radiation. Some x-ray imaging applications require a narrow spectrum of emitted radiation, and low ripple or variation across the x-ray tube is very important in producing the narrow spectrum of radiation. Triggering the x-ray tube into conduction changes the load connected to the power supply, which further increases the difficulty of maintaining the desired output voltage. Good responsiveness in output voltage regulation is very important in the satisfactory performance of x-ray power supplies.

To increase the voltage output level, reduce the ripple and to obtain more responsive regulation, higher frequency converters are desirable. For example the best currently available x-ray power supplies operate at a conversion frequencies in the range of about 80 to 100 kHz.

It is with respect to this general background information, and other more specific information not specifically discussed herein that the present invention has resulted.

SUMMARY OF THE INVENTION

The general aspect of the present invention is a new and improved continuous, in-phase, switched-mode, high-frequency resonant converter power supply. Switching occurs in phase with the primary resonant current, and when the magnitude of the primary resonant current is at approximately a zero value at the zero crossing points in each alternating half cycle. The switching transistors are not, therefore, required to absorb significant amounts of power during switching. Zero-crossing-point, in-phase switching occurs in both the situation where current is added to the naturally resonating current to increase the output power from the power supply, referred to as a "drive" condition, and in the situation where current is absorbed from the naturally resonating current to reduce the output power of the power supply, referred to as a "clamp" condition.

One specific aspect of the improvements of the present invention is a capability of achieving a drive condition or a clamp condition for each half cycle of naturally alternating current in the resonant primary circuit of a continuous resonant converter, independently of the drive or clamp condition which existed on the preceding half cycle. Switching to achieve the drive and clamp conditions independently for each half cycle occurs at a rapid rate in synchronism with the natural resonant frequency of the primary circuit. A switching controller, a switch selector and current switches supply the additional current to the resonant primary circuit during drive conditions, or allow the resonant alternating current to naturally decay during clamp conditions. As a result of driving or clamping on each half cycle, more precise and effective power regulation occurs with less lag time in the response.

Another specific aspect of the improvements of the present invention is a capability of rapidly making determinations to control the driving or clamping with each half cycle of the naturally alternating current in the resonant primary circuit of a continuous resonant converter, even at very high frequencies such as 100 kHz. A half cycle current detector determines the magnitude of the current flowing in each half cycle and adjusts the level of a control feedback signal on a corresponding half-cycle-by-half-cycle basis. A switching controller responds to changes in the level of the control feedback signal to control the driving and clamping conditions. As a result, enhanced responsiveness in power regulation is achieved.

A further specific aspect of the improvements of the present invention is a capability of establishing patterns of driving and clamping conditions to obtain the most effective power regulation and the best responsiveness to changing conditions in a continuous resonant converter. An effective technique for achieving regulation under stable output conditions is to obtain the greatest frequency or degree of alternation of clamping and driving conditions on a half-cycle-by-half-cycle basis. By operating in this manner, the greatest sensitivity to the desired stable output condition is obtained, since any slight excursion from the stable condition will immediately create the appropriate change in the alternating drive and clamp conditions. On the other hand, responsiveness to significantly changing conditions is not compromised because significant excursions from the desired stable output condition result in consistent application of the drive or clamp conditions until the desired stable state condition is approached and reached. Further still, the pattern of drive and clamp conditions is varied in accordance with the degree of difference between the actual and desired conditions to obtain an effective degree of responsiveness without creating substantial overshoot or hunting conditions which sometimes occur when attempting to achieve the highest degree of responsiveness of a feedback control system.

Further still, another specific aspect of the improvements of the present invention is a algorithmic capability of establishing the patterns of driving and clamping conditions. One particular algorithm of patterns is accomplished by comparing the feedback control signal to a level representative of an average of the previous drive and clamp conditions to establish the present drive and clamp pattern. Another algorithm compares the feedback control signal to a weighted average of a predetermined number of previous drive and clamp conditions to establish the drive and clamp pattern. The weighted average provides a bias toward the more current drive and clamp conditions to increase the responsiveness toward present conditions while still achieving some moderation due to previous conditions. Another algorithm uses the level of the feedback control signal to create a predetermined pattern of drive and clamp conditions to occur to achieve the degree of affect represented by the feedback control signal. Still another algorithm results from a binary rate multiplication of a digital signal representative of the level of the feedback control signal. These exemplary algorithms, or others, may be effectively used to achieve a desired pattern of drive and clamp conditions for effective power regulation with the present invention.

Another aspect of the improvements of the present invention relates to a new switch configuration for driving or clamping current in the resonant primary circuit of a resonant converter. A stack of four current switches is connected to conduct through the resonant primary circuit. The resonant primary circuit includes a storage capacitor which is part of the reactive components, and two of the four current switches control the charging of the storage capacitor from a DC power supply during one half cycle of a drive condition. During the other half cycle of the drive condition, the other two current switches discharge the storage capacitor. A pair of biasing capacitors are placed across the stack of four current switches to establish a voltage bias midpoint. The bias midpoint effectively limits the voltage applied across the current switches during the drive and clamp conditions. By limiting the voltage, less costly current switches may be employed in many situations, without encountering a decrease in performance or reliability.

Even further still, another aspect of the improvements of the present invention is a capability of selecting which current switches are to be conductive during the clamp condition in order to evenly distribute the natural heating which occur during conduction. A clamping condition may be achieved by causing either of two switches to become conductive. A switch selector selects between the two switches in a alternating pattern to evenly dissipate the heat between them. The selection between the switches during clamping conditions also maintains the bias midpoint at the desired level. If the bias midpoint established by the midpoint bias capacitors moves out of a predetermined range of acceptable values, the switch selector ceases controlling the current switches in the alternating pattern during clamping conditions and instead controls the current switches to charge the midpoint bias capacitors and restore the midpoint bias within the desired range. As a result, less costly current switches can be employed, and the power dissipated by the current switches during clamping conditions is evenly distributed.

Another aspect of the improvements of the present invention relates to the power transformer for a high voltage converter. The secondary windings of the power transformer are formed as circuit traces on a plurality of printed circuit boards (PCBs) and the PCBs are connected together to obtain the necessary degree of output voltage. A closed loop core of the transformer extends through a hole in the PCBs to couple flux to the PCB secondary windings. The primary winding is a single sheet conductor which encircles the core. The position of the primary sheet conductor relative to the secondary PCB windings minimizes the interwinding coupling capacitance between the primary and secondary windings. The primary-secondary interwinding capacitance can create a substantial parasitic loss due to the difference in voltage between the primary and secondary windings. By minimizing the coupling capacitance, the losses are decreased and the efficiency is increased. By making the secondary windings as PCB conductor traces, each trace is uniformly positioned in a predetermined location with respect to each other trace of a adjacent PCB. The uniformity in spacing creates less potential for breakdown of the insulation surrounding the secondary winding PCB traces and less variations in inter-winding capacitance. As a consequence the transformer exhibits less potential for breakdown, can be constructed from less expensive materials and does not require the degree and amount of insulation that would otherwise be required.

Another aspect of the improvements of the present invention is a current limiting capability of a power supply, to restrict the maximum amount of current which may be delivered and to restrict the frequency or interval of attempts to deliver the current. A maximum rate of increase of current is predetermined and any attempt to deliver current which exceeds this rate of increase will immediately inhibit the delivery of current. Furthermore, each attempt to deliver excessive current also limits the interval at which a subsequent attempt can be made. The intervals occur at a lower rate than the natural frequency of the resonant primary circuit. These features are particularly important in achieving safety of operation during short circuit or arcing conditions.

A last aspect of the present invention is the incorporation of these and other improvements in a power supply which offers substantial advantages for energizing a x-ray device or similarly rigorous application.

A more complete appreciation of the present invention and its scope can be obtained by reference to the accompanying drawings, which are briefly summarized below, the following detailed description of a presently preferred embodiment of the invention, and the appended claims.

BRIEF DESCRIPTION OF THE DRAWINGS

FIG. 1 is a generalized block diagram of power supply for an x-ray tube, incorporating the features of the present invention.

FIG. 2 is a more detailed block diagram of features of the power supply of the present invention, specifically illustrating a controller interface, switch, high voltage transformer and high voltage rectifier of one power supply shown in FIG. 1.

FIG. 3 is a schematic diagram of a conventional H-bridge switch and a connected high voltage transformer, which may be utilized in the power supply shown in FIG. 2.

FIG. 4 is a waveform diagram illustrating the resonant sinusoidal current in the primary winding circuit of the high voltage transformer, as shown in FIG. 3.

FIG. 5 is a waveform diagram utilizing the same time axis as FIG. 4, illustrating the in-phase current delivered by the switch to the resonant primary circuit of the high voltage transformer, as shown in FIG. 3.

FIG. 6 is a schematic diagram of an improved switch in accordance with the present invention connected in a resonant circuit to the primary winding of the high voltage transformer, as preferably utilized in the power supply shown in FIG. 2, and as an alternative to that shown in FIG. 3.

FIG. 7 is a simplified schematic diagram of a differential amplifier and a filter and proportioning circuit connected in a feedback path to the differential amplifier, utilized in the power supply shown in FIG. 2.

FIG. 8 is a simplified schematic diagram of the presently preferred form of a half cycle current detector, utilized in the power supply shown in FIG. 2.

FIGS. 9 through 19 are waveform diagrams illustrating signals applied to and created within the half cycle current detector shown in FIG. 8, all of which have a common time axis with the waveform diagram shown in FIGS. 4 and 5.

FIGS. 20 through 23 are alternative embodiments of an algorithmic switching controller utilized in the power supply shown in FIG. 2. FIGS. 20 and 21 are schematic and block diagrams, and FIGS. 22 and 23 are block diagrams.

FIGS. 24A and 24B form a single logic diagram illustrating the simplified functional logic of the switch selector utilized in the power supply shown in FIG. 2.

FIG. 26 is a perspective view of an improved high-voltage power transformer preferably employed in the power supply shown in FIG. 2, with a portion thereof broken out for clarity.

FIG. 27 is a section view of a closed loop core of the transformer shown in FIG. 26, taken substantially in the plane of line 27—27 in FIG. 26.

FIG. 28 is a partial section view of the closed loop core of the transformer shown in FIG. 26, taken substantially in the plane of line 28—28 in FIG. 26.

FIG. 29 is an enlarged partial section view of an assembly of printed circuit board secondary windings of the transformer shown in FIG. 26, taken substantially in the plane of line 29—29 in FIG. 26.

DETAILED DESCRIPTION

Figure 25:
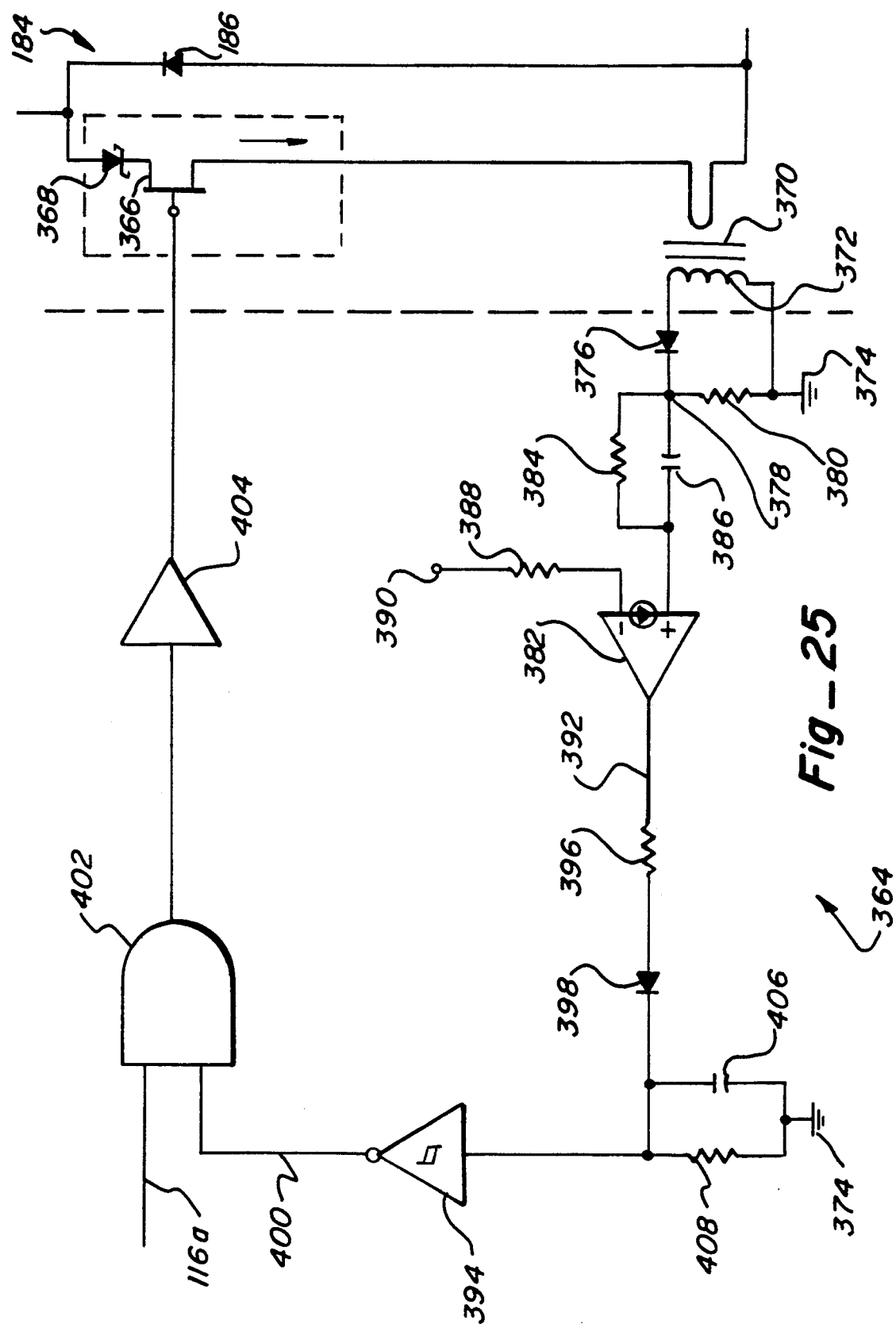
FIG. 25 is a schematic diagram of a current switch with a current limiting circuit, preferably employed in the switch selector shown in FIG. 2.

The new and improved features of the present invention are advantageously incorporated in a power supply for an x-ray device, such as that one 50 shown in FIG. 1. The x-ray power supply 50 shown in FIG. 1 receives conventional commercial line power, preferably three phase current supplied at 480 volts, as illustrated at 52. The line power at 52 is applied to a conventional three phase full wave bridge rectifier 54, which delivers rectified DC power at 56, at approximately 680 volts DC. The DC power 56 is applied to switches 58 and 58'. Control signals 60 are supplied by a controller interface 62 and cause the switches 58 and 58' to switch the DC power 56 through the primary winding of high voltage transformers 64 and 64'. The high voltage transformers 64 and 64' increase the voltage to a predetermined high level, for example 75,000 volts (75 kv), and this predetermined high voltage is applied to conventional high voltage rectifiers 66 and 66'. A positive high voltage rectifier 66 establishes a positive high level voltage, and a negative high voltage rectifier 66' establishes a negative reference voltage. The positive and negative voltages available from the high voltage rectifiers 66 and 66' are applied to the anode and cathode, respectively, of an x-ray tube 68. The x-ray tube 68 is triggered into conduction by a rapid increase in voltage across the tube 68, or by a signal applied to a grid of a different type of tube which is not shown.

These components of the x-ray power supply 50 form two separate power supplies. A positive voltage power supply 80 is formed by the switch 58, the positive high voltage transformer 64 and the high voltage rectifier 66, operating in conjunction with the controller interface 62. A negative voltage power supply 80' is formed by the switch 58', the high voltage transformer 64' and the negative high voltage rectifier 66', also operating in conjunction with the controller interface 62. The positive voltage and negative voltage power supplies 80 and 80' are essentially similar, except that the output voltage supplied by the high voltage rectifiers 66 and 66' of each supply is of opposite polarity. The features of the present invention are incorporated in each of the power supplies 80 and 80'. However, the features of the present invention may be advantageously incorporated in other types of power supplies used for other purposes.

A conventional microcomputer or processor 70 receives input signals from a conventional input device 72. Output signals supplied by the processor 70 control the controller interface 62 and establish the level of output power supplied by the high voltage rectifiers 66 and 66', among other things. A positive high voltage feedback signal 74 is supplied from the high voltage rectifier 66 to the controller interface 62. The positive high voltage feedback signal 74 is directly related to the voltage supplied by the rectifier 66. A positive current feedback signal 76 is supplied from the primary winding of the high voltage transformer 64 to the controller interface 62. The positive current feedback signal 76 is directly related to the current flowing in the primary winding of the high voltage transformer 64. Similarly, a negative high voltage feedback signal 74' is supplied from the high voltage rectifier 66' to the controller interface 62. The negative high voltage feedback signal 74' is directly related to the voltage supplied by the rectifier 66'. A negative current feedback signal 76' is supplied from the primary winding of the high voltage transformer 64' to the controller interface 62. The negative current feedback signal 76' is directly related to the current flowing in the primary winding of the high voltage transformer 64. The high voltage feedback signals 74 and 74', and the current feedback signals 76 and 76', operate in conjunction with the controller interface 62 to operatively control and regulate, by varying the control signals 60, the voltage and power output of the two power supplies 80 and 80' of the x-ray power supply 50. In some circumstances the control signals 60 are different for each of the power supplies 80 and 80' to achieve the desired effects.

Details concerning the positive voltage power supply 80 are described in conjunction with FIG. 2. Due to the identity of features in both the positive voltage and negative voltage power supplies 80 and 80', only the components and functionality associated with the positive voltage power supply 80 will be described hereafter, since the negative voltage power supply 80' is functionally identical.

The power supply 80 is shown in FIG. 2 to include the controller interface 62, the switch 58, which receives the rectified DC power 56, the high voltage transformer 64, and the high voltage rectifier 66 connected to the high voltage transformer 64. Only the portion of the controller interface 62 is illustrated which relates to the switch 58, the high voltage transformer 64 and the high voltage rectifier 66.

A voltage set point command signal 82 is supplied by processor 70 to establish the level of desired output voltage from the power supply 80. The command signal 82 is applied to a non-inverting input terminal of a differential amplifier 84 of a voltage feedback control loop. In addition to the differential amplifier 84, the voltage feedback control loop also includes a voltage sensor 86 which senses the high voltage output supplied by the rectifier 66 and transforms that voltage to a proportionally lower voltage feedback signal 88. The voltage sensor 86 is preferably a resistive voltage divider network with appropriate capacitive filtering to simply reduce the level of the positive output voltage supplied by the rectifier 66 to a magnitude that is compatible with the operation of the differential amplifier 84.

The voltage feedback signal 88 is applied to the inverting input terminal of the differential amplifier 84. The difference between the signals 82 and 88 creates a current set point command signal 90. A voltage control loop filter and proportioning circuit 92 is connected between the output of the differential amplifier 84 and the negative input terminal. The filter and proportioning circuit 92 establishes a degree of filtering to improve control response and reduce the effects of spurious components of the voltage feedback signal 88. The filter and proportioning circuit 92 also establishes the requisite degree of gain for the differential amplifier 84. A command signal 94 from the processor 70 is applied to the filter and proportioning circuit 92 in order to establish the requisite degrees of filtering and gain.

A current feedback control loop is also used to regulate the output power of the power supply 80. The current feedback control loop is nested within the voltage feedback control loop. This nested configuration, also referred to as a cascade configuration, makes both control loops instrumental in regulating the voltage level of the DC output voltage supplied by the power supply 80. The cascade connection of the voltage and current control loops provides faster, more stable responses to voltage changes in the DC output voltage and improves the ability of the control loops to regulate the DC output voltage at a fixed voltage level. The feedback control arrangement can also be used to control output current, with appropriate modifications.

The current feedback control loop includes a current sensing transformer 96, a half cycle current detector 98, a current control differential amplifier 102 and a current control loop filter and proportioning circuit 106 connected in a feedback arrangement across the differential amplifier 102. The current sensing transformer 96 is connected to sense the current flowing in the primary winding of the transformer 64 which is part of the resonant primary circuit. The sensing transformer develops the current feedback signal 76 which has a AC frequency and magnitude directly related to those characteristics of the primary resonant current.

The current feedback signal 76 is applied to the half cycle current detector 98, which responds by determining the magnitude of primary resonant current on a half-cycle-by-half-cycle basis. The magnitude of the primary resonant current during each positive half cycle is determined separately from the magnitude of the resonant current during each negative half cycle of the resonant current. The half cycle current detector 98 supplies a current level signal 100 which has an analog level Which represents peak magnitudes of the current during each subsequent half cycle.

The current level signal 100 is applied to the negative input terminal of the differential amplifier 102. The current set point command signal 90 from the voltage control differential amplifier 84 is applied to the non-inverting input terminal of the differential amplifier 102. The difference between the command signal 90 and the current level signal 100 is supplied as a control output signal 104. A portion of the control output signal 104 is fed back through the current control loop filter and proportioning circuit 106 to the inverting input terminal of the differential amplifier 102. The current control loop filter and proportioning circuit 106 establishes the gain of the control loop, improves control response and reduces any spurious components of the current level signal 100 which would otherwise affect the control output signal 104. In addition, the processor 70 supplies a control signal 108 to the filter and proportioning circuit 106 for the purpose of establishing the proper amount of gain and filtering in accordance with the amount of power or voltage to be delivered by the power supply 80, as selected by the processor 70.

An algorithmic switching controller 110 supplies an algorithm output signal 112 to a switch selector 114 in response to the level of the control output signal 104. The algorithm output signal 112 represents a pattern of drive or clamp signals which the switch selector 114 will cause the switch 58 to deliver to achieve the amount of regulation represented by the control output signal 104. The algorithm output signal 112 is interpreted by the switch selector 114 to cause the switch selector 114 to supply corresponding drive or clamp signals 116 to the switch 58. Drive signals 116 cause the switch 58 to switch power from the DC power 56 through the primary winding of the high voltage transformer 64. The current delivered to the primary winding is in phase with current naturally resonating in the resonant primary circuit. Clamp signals 116 cause the switch 56 to terminate the delivery of power 56 to the resonant primary circuit and allow the current which is naturally resonating in the primary winding to decay as a result of the impedances of the resonant primary circuit and power transfer through the high voltage transformer 64.

In order to cause the switch selector 114 to operate in a continuous in-phase mode with the current normally resonating in the primary winding of the transformer 64, and to synchronize the operation of the half cycle current detector 98, timing information related to the naturally resonating current in the resonant primary circuit must be obtained. This timing information is obtained by using current feedback signal 76, which is directly related in magnitude and frequency to the resonant current in the resonant primary circuit. The current feedback signal 76 is applied to circuitry including a zero crossing detector 118; a phase lock loop oscillator circuit formed by a phase comparator 120, a voltage control oscillator 122, and a divider 124; a timing calculation circuit 134 and timing logic within the switch selector 114.

The AC current feedback signal 76 is applied to the zero crossing detector 118, and the zero crossing detector changes states upon the transition of the current feedback signal 76 from a positive half cycle to a negative half cycle. A half cycle output or phase signal 126 from the zero crossing detector 118 becomes high or positive during the positive half cycles and low or zero during negative half cycles. The phase signal 126 is applied to the switch selector 114 and the algorithmic switching controller 110. The switch selector 114 and the algorithmic switching controller 110 use the phase signal 126 to recognize when positive half cycles of current are flowing in the resonant primary circuit and when negative half cycles of current are flowing in the resonant primary circuit.

The phase signal 126 is also applied to the comparator 120 of the phase lock loop oscillator circuit. The voltage controlled oscillator 122 responds to an output signal 128 from the phase comparator 120 to generate a high frequency output signal 130 having a frequency many times greater than the corresponding frequencies of the phase signal 126 and the current feedback signal 76. The high frequency output signal 130 is applied to the divider 124, which divides the frequency of the signal 130 and generates a plurality of multiplied frequency signals 132 which have frequencies that are selected fractions of the frequency of the high frequency output signal 130 and multiples of the frequency of the phase signal 126. The divider 124 may be programmable to produce the selected multiplied frequency signals 132, for example those having frequencies between ½ and 1/512 of the frequency of the high frequency output signal 130.

One of the multiplied frequency signals 132a has a frequency Which is approximately comparable to the frequency of the phase signal 126. The signals 126 and 132a are applied to the input terminals of the phase comparator 120. The phase comparator 120 compares the phase relationship of the signals 126 and 132a and supplies the output signal 128 at a magnitude representative of the phase difference. The voltage controlled oscillator 122 responds to the output signal 128 to vary the frequency of the high frequency output signal 130. The change in frequency of the signal 130 causes a change in the frequency and phase of the multiplied frequency signals 132 until the phase error between the signals 132a and 126 is either zero or at a sustained constant value. With the zero or sustained phase error signal, the frequencies of the signals 132a and 126 are equal, and the multiplied frequency signals 132 from the divider 124 are integral multiples of the frequency of the phase signal 126 and the current feedback signal 76. The multiplied frequency signals 132 are useful for deriving precise timing points at fractional times during the occurrence of each phase signal 126, which corresponds to fractional points within each half cycle of the naturally resonant current flowing in the resonant primary circuit.

The multiplied frequency signals 132 are applied to the timing calculation circuit 134, which is preferably implemented as a programmable logic array (PAL). The timing calculation circuit 134 logically combines selected ones of the multiplied frequency signals 132 to derive a plurality of sampling and control signals 136. The sampling and control signals 136 control the operation of the half cycle current detector 98 in synchronism with the naturally resonating current flowing in the resonant primary circuit. The multiplied frequency signals 132 are also applied to the switch selector 114, where they control the timing of the drive and clamp signals 116 applied to the switch 58. With the synchronism of the drive and clamp signals 116 to the primary resonating current, the switch 58 switches in phase with and at the zero magnitude points of the naturally resonating current in the resonant primary circuit.

One embodiment of the switch 58 is shown in FIG. 3 as a conventional H-bridge switch. The H-bridge configuration may be adequately used with some but not all of the improvements of the present invention, as will be apparent from the following description. The switch 58 is a single phase inverter circuit which has an upper input node 138, a lower input node 140, a left output node 142, and a right output node 144. DC power 56 is connected to the input nodes 138 and 140, with positive DC voltage connected to the upper input node 138 and negative DC voltage connected to the lower input node 140. The resonant primary circuit 146 of the high voltage transformer 64 is connected in series between the left output node 142 and the right output node 144. An upper left current switch 148 is connected between the upper input node 138 and the left output node 142. An upper left diode 150 is connected in parallel with the upper left current switch 148 and is oriented to conduct current only from the left output node 142 to the upper input node 138. An upper right current switch 152 is connected between the upper input node 138 and the right output node 144, with a diode 154 connected in parallel with the switch 152 and oriented to conduct current only from the right output node 144 to the upper input node 138. A lower left current switch 156 is connected between the lower input node 140 and the left output node 142, with a lower left diode 158 connected in parallel with the current switch 156 and oriented to conduct current only from the lower input node 40 to the left output node 142. A lower right current switch 160 is connected between the lower input node 140 and the right output node 144 with a lower right diode 162 connected in parallel with the current switch 160 and oriented to conduct current only from the lower input node to the right output node.

The current switches 148, 152, 156 and 160 may be any type of controlled switch which can operate at relatively high frequencies. In the preferred embodiment, metal oxide semi-conductor field effect transistors (MOS-FETs) are used, but silicon-controlled rectifiers (SCRs), insulated gate bipolar transistors (IGBTs), thyristors and other types of transistors may also be employed in some applications. The MOS-FET current switches 148, 152, 156 and 160 have substantial advantages over other types of current switches. MOS-FETs can switch very rapidly regardless of their current conductivity state. In addition the MOS-FETs can typically operate at higher frequencies than can SCRs and thyristors.

Each of the current switches 148, 152, 156 and 160 may in actuality be a plurality of MOS-FETs connected in parallel. The plurality of parallel MOS-FETs increases the current carrying capacity of each switch. Functionally, however, the plurality of MOS-FETs for each of the current switches 148, 152, 156 and 160 functions as a single current switch and will be described as a single current switch.

The primary circuit 146 of the high voltage transformer 64 includes a resonator inductor 164 and a resonator capacitor 166 connected in series with a primary winding 168 of the transformer. The current sensing transformer 96 is also connected in series with the primary circuit 146. Current flowing in the primary winding 168 creates magnetic flux in a core 169 of the transformer 64 which induces a voltage in the secondary winding 170 which in turn causes current to flow in a secondary winding of the transformer 64. The voltage across the secondary winding 170 is stepped up from the voltage across the primary winding 168 by the ratio of the turns of the secondary winding 170 to the turns of the primary winding 168. The number of turns of the secondary winding 170 are considerably greater than those of the primary winding 168, thereby causing the output voltage across the secondary winding to be much greater than the voltage across the primary winding 168. It is desirable to keep the voltage across the primary winding 168 as low as possible to reduce the influences on the voltage at the secondary winding 170 other than those caused by the turns ratio.

The primary winding 168, the resonator inductor 164, and the resonator capacitor 166 form the resonant primary circuit 146. The resonator inductor 164 and transformer primary winding 168 will magnetize in alternating polarities and the resonator capacitor 166 will charge and discharge in alternating polarities in a well known manner at a natural resonant frequency. The resonant frequency of the primary circuit 146 is established by the impedances of the resonator inductor 164 and primary winding 168 and by the capacitance of the resonator capacitor 166. The current sensing transformer 96 has a very small inductance and has a negligible effect on the reactance of the resonant primary circuit 146. The combined inductance of the primary winding 168 of the high voltage transformer 64 and the resonator inductor 164 and the capacitance of the resonator capacitor 166 are selected so that the primary circuit 146 has a natural resonant frequency approximately within the range of 80,000 to 100,000 Hertz (100 kHz). The current in the resonant primary circuit 146 and the primary winding 168 will tend to oscillate sinusoidally between a positive half cycle 172 and a negative half cycle 174 at the natural resonant frequency, as illustrated in FIG. 4.

Energy is injected into the primary circuit 146 of the high voltage transformer 64 by the switch 58 at the output nodes 142 and 144. To maximize energy transfer and to cause the primary circuit 146 to resonate continuously, energy is injected into the primary circuit 146 at the output terminals 142 and 144 in both positive and negative drive pulses at the resonant frequency of the primary circuit 146 and in phase with the half cycles 172 and 174 of naturally resonating current flowing in the primary circuit 146. FIG. 5 illustrates the drive pulses 176 and 178, their in-phase relationship with the half cycles of current 172 and 174 illustrated in FIG. 4, and their occurrence and termination at the zero magnitude points of the half cycles 172 and 174.

To inject the drive pulses of energy into the resonant primary circuit the current switches 148, 152, 156 and 160 are actuated by the drive signals 116 in a predetermined sequence which causes the pulses 176 and 178 (FIG. 5) of the current flow in an alternating fashion. The current flows from the left output node 142 of the switch 58 through the primary circuit 146 of the transformer 64 to the right output node 144 of the switch 58, and from the right output node 144 of the switch 58 through the primary circuit 146 of the high voltage transformer 64 to the left output node 142. The conduction of each current switch 146, 152, 156 and 160 is controlled by an individual drive or clamp signal 116a, 116b, 116c and 116d respectively (collectively 116 in FIG. 2), supplied by the switch selector 114 (FIG. 2).

To inject a positive drive pulse 176 into the resonant primary circuit 146, two drive signals 116a and 116d supplied from the switch selector 114 (FIG. 2) cause the upper left current switch 148 and the lower right current switch 160 to close. The other two drive signals 116b and 116c cause the upper right current switch 152 and the lower left current switch 156 to be open. The application of the drive signals 116a and 116d are synchronized with the positive half cycle 172 of resonating current to begin and end the positive drive pulse 176 in phase with and at the zero magnitude level of the positive half cycle 172 of resonating current. A current path is established from the positive upper input node 138 through the upper left current switch 148, the left output node 142, the resonator inductor 164, the resonator capacitor 166, the primary winding 168 and the current sensing transformer 96 to the right output node 144. From the right output node 144 the current path is through the lower right current switch 160 to the negative lower output node 140. Rectified power 56 flows from the positive upper input node 138 to the negative lower input node 140 through the primary circuit 146 in the direction of the positive half cycle 172 of the resonating current.

To inject the negative drive pulse 178 (FIG. 5) into the primary circuit 146 two drive signals 116b and 116c from the switch selector 114 (FIG. 2) cause the upper right current switch 152 and the lower left current switch 156 to close. Two additional drive signals 116a and 116d cause the lower right current switch 160 and the upper left current switch 148 to be open. The drive signals 116 are synchronized with the negative half cycle 174 (FIG. 4) of the resonating current to begin and end the negative drive pulse 178 (FIG. 5) in phase with the negative half cycle 174 of resonating current.

Current flows from the positive upper input node 138 through the upper right current switch 152 to the right output node 144. From the right output node 144 the current flows in the direction of the negative half cycle 174 (FIG. 4) through the current sensing transformer 96, the primary winding 168, the resonator capacitor 166, and the resonator inductor 164 to the left output node 142 of the switch 58. From the left output node 142 the current flows through the closed lower left current switch 156 to the negative lower input node 140.

If it is not desired to add energy to the resonant primary circuit 146 may be clamped by closing one of the current switches 148, 152, 156 or 160. By clamping the resonant primary circuit instead of driving it, current is allowed to decay in the resonant primary circuit at the resonant frequency. An impedance is inherent in the resonant primary circuit and a load is also reflected into the resonant primary circuit from the load connected to the secondary winding of the transformer 64. This impedance causes the resonant primary energy, and thus the output current and voltage, to decay when the resonant primary circuit 146 is clamped. Thus it can be seen that the current delivered by the high voltage transformer 64 to the rectifier 66 (FIG. 2) can be controlled by selectively applying drive pulses 176 and 178 (FIG. 5) to inject energy into the resonant primary circuit, and by selectively clamping the resonant primary circuit to allow the energy to decay.

A clamp condition is created by a clamp signal 116 from the switch selector 114 (FIG. 2). To clamp while the primary resonating current is flowing in the direction of a positive half cycle 172 (FIG. 4) one clamp signal 116d or 116a causes the lower right current switch 160 or the upper left current switch 148, respectively, to close while the remaining three clamp signals 116 cause the other three of the current switches to be open. This establishes a closed circuit in which current can flow in a positive direction from the left output node 142 through the resonator inductor 164, resonator capacitor 166, primary winding 168, and current sensing transformer 96 to the right output node 144.

If the lower right current switch 160 is closed by the clamp signal 116d the path is completed from the right output node 144 through the lower right current switch 160 through the lower left diode 158 to the left output terminal 142. The input of rectified power 56 is blocked by open upper left and upper right current switches 148 and 152 and the upper left and upper right diodes 150 and 154 which block conduction from the positive upper input node 138.

If the upper left current switch 148 is closed by the clamp signal 116a the path is completed from the right output node 144 through the upper right diode 154 and the upper left current switch 148 to the left output node 142. Current flow from the rectified power 56 is blocked by the open lower left current switch 156 and the lower left diode 158 and the open lower right current switch 160 and the lower right diode 162, which cooperate to block the flow of current to the lower negative input terminal 140.

To clamp when the primary resonating current is flowing in the direction of a negative half cycle 174 (FIG. 4) a selected one of the lower left current switch 156 or the upper right current switch 152 is closed by one clamp signal 116c or 116b, respectively, from the switch selector 114 (FIG. 2), while the other three current switches are held open by the other three clamp signals 116. A path is thus established for the negative flow of current from the right output terminal 144, through the current sensing transformer 96, the primary winding 168 of the high voltage transformer 64, the resonator capacitor 166 and the resonator conductor 164 to the left output node 142.

If the clamp signal 116c has caused the lower left current switch 156 to be closed the current path is completed from the left output node 142 through the lower left current switch 156 and the lower right diode 162 to the right output node 144. Current from the rectified power 56 is blocked by the open upper left current switch 148 and upper right current switch 152 and the upper left and upper right diodes 150 and 154, which cooperate to block the flow of current from the positive upper input node 138.

If the clamping signal 116b closes the upper right current switch 152 the path is completed from the left output node 142 through the upper left diode 150 and the upper right current switch 152 to the right output node 144. Current from the rectified power 56 is blocked by the open lower left and lower right current switches 156 and 160 and the lower left and lower right diodes 158 and 162, which cooperate to block the flow of current from the negative lower input node 140.

The flow of current through the closed current switch 148, 152, 156 or 160 during a clamp cycle requires that the closed current switch dissipate a quantity of energy. This dissipation of energy causes the preselected closed current switch 148, 152, 156 or 160 to absorb heat and rise in temperature. An excessive temperature rise can be damaging to the current switch. By alternating the clamping effects achieved by the current switches 148, 152, 156 or 160 it is possible to distribute this heating effect among the current switches, thus reducing the heating of any one of the current switches due to clamping.

MOS-FET switches typically are rated to withstand either 500 volts or 1000 volts. MOS-FETs designed to withstand 500 volts are more widely used than MOS-FETs designed to withstand 1000 volts. Because of the greater market, the 500 volt MOS-FETs are less expensive than the 1000 volt MOS-FETs. It is, therefore, advantageous to be able to use 500 volt MOS-FETs. However, the conventional H-bridge configuration (FIG. 3) will not permit use of the 500 volt MOS-FETs because the conventional H-bridge configuration requires that each of the current switches be capable of withstanding the full voltage of the rectified power at 56, which is approximately 680 volts DC.

An improved bridge design for the switch 58, which utilizes 500 volt MOS-FET current switches arranged in a stack, is shown and described in conjunction with FIG. 6. Rectified power at 56 is connected to the positive upper input node 138 and the negative lower input node 140. The resonant primary circuit 146, which includes the resonator inductor 164, resonator capacitor 166, primary winding 168 and current sensing transformer 96, is connected in series between an upper output node 180 and a lower output node 182 of the switch 58.

A first current switch 184 and parallel first diode 186 are connected between the upper input node 138 and the upper output node 180 with the diode 186 oriented to conduct only from the upper output node 180 to the upper input node 138. A second current switch 188 and a parallel second diode 190 are connected between the upper output node 180 and an intermediate midpoint node 192. The second diode 190 is oriented to conduct current only from the midpoint node 192 to the upper output node 180. A third current switch 194 and a parallel third diode 196 are connected between the midpoint node 192 and the lower output node 182, with the third diode 196 oriented to conduct current only from the lower output node 182 to the midpoint node 192. A fourth current switch 198 and a parallel fourth diode 200 are connected from the lower output node 182 to the lower input node 140, with the fourth diode 200 oriented to conduct current only from the lower input node 140 to the lower output node 182. The first and second current switches 184 and 188 form an upper half bridge 202 and the third and fourth current switches 194 and 198 form a lower half bridge 204.

An upper half bridge capacitor 206 is connected between the upper input node 138 and the midpoint node 192 and a lower half bridge capacitor 208 is connected between the midpoint node 192 and the lower input node 140. The values of the upper half bridge capacitor 198 and the lower half bridge capacitor are selected to be as nearly identical as typical tolerances will allow. The charged capacitors 206 and 208 act as a voltage divider causing the magnitude of the voltage across the upper half bridge 202 from the upper input node 138 to the midpoint node 192 to be approximately equal to the magnitude of the voltage across the lower half bridge 204 between the midpoint node 192 and the lower input node 140. The voltage across each half bridge is approximately one-half the voltage of the rectified power at 56, or approximately 340 volts DC. The current switches 186, 190, 196 and 200 thus are only required to withstand approximately 340 volts at any time when either of the current switches of either half bridge is closed and the other is open. Thus 500 volt MOS-FETs may be used in the switch configuration 58 shown in FIG. 6.

To add energy to the resonant primary circuit 146 two drive signals 116a and 116d cause the first and fourth current switches 184 and 198 to close in phase with the positive half cycle 172 (FIG. 4) of the current in the primary circuit 146. The other drive signals 116c and 116b cause the second and third current switches 188 and 194 to be open. Current from 56 passes from the positive upper input terminal 138, through the closed first current switch 180 to the upper output node 184, through the resonator inductor 164, resonator capacitor 166, primary winding 168 of the high voltage transformer 64, and current sensing transformer 96 to the lower output node 182. Current flows from the lower output node 182 through the closed fourth current switch 198 to the negative lower input node 140.

To drive during the negative half cycle 174 (FIG. 4), two drive signals 116b and 116c cause the second and third current switches 188 and 194 to close in phase with the negative half cycle 174 (FIG. 4) of the current in the resonant primary circuit 146. The two other drive signals 116a and 116d cause the first and fourth current switches 184 and 198 to be open. The drive energy for a negative drive pulse 178 (FIG. 5) is produced by the discharge of the resonator capacitor 166. A path for current is created from the upper output node 180 through the closed second and third current switches 188 and 194 to the lower output node 182 and from the lower output node 182 through the current sensing transformer 96 and the primary winding 168 of the high voltage transformer 64, the resonator capacitor 166 and the resonator inductor 164 to the upper output node 180 of the switch 58.

To clamp during a positive half cycle 172 (FIG. 4) a clamp signal 116a or 116d causes a selected one of the first current switch 184 or the fourth current switch 198 to close in phase with the positive half cycle 172 of the current in the resonant primary circuit 146. The other three clamp signals 116 cause the other three current switches to be open. When the first current switch 184 is closed, a path is created from the positive upper input node 138 through the first current switch 184 to the upper output node 180 and from there through the resonator inductor 164, resonator capacitor 166, primary winding 168 and current sensing transformer 96 to the lower output node 182. From the lower output node 182 the current flows through the third diode 196 to the midpoint node 192. The current flow at the midpoint node 192 flows from there through the lower half bridge capacitor 208 to the negative output terminal 140. Clamping in this manner tends to charge the lower half bridge capacitor 208, elevating the voltage of the midpoint node 192 with respect to the voltages of the upper and lower input nodes 138 and 140.

The positive half cycle 172 (FIG. 4) may also be clamped by application of a clamping signal 116d which closes the fourth current switch 198. In this case the positive half cycle current 172 flows from the positive upper input node 138 through the upper half bridge capacitor 206 to the midpoint node 192, from the midpoint node 192 through the second diode 190 to the upper output node 180. From the upper output node 180 current flows through the resonator inductor 164, the resonator capacitor 166, the primary winding 168 and the current sensing transformer 96 to the lower output node 182. From the lower output node 182 current flows through the fourth current switch 198 to the negative lower node 140. When a positive half cycle 172 is clamped by closing the fourth current switch 198, the upper half bridge capacitor 206 is charged and the voltage of the midpoint node 192 is lowered with respect to the upper and lower input nodes 138 and 140.

A negative half cycle 174 (FIG. 4) of current may be clamped in a similar fashion. A negative clamp signal 116c or 116b is applied to close a selected one of the second and third current switches 188 or 194 in phase with a negative half cycle 174. The other three clamp signals 116 hold the other three current switches open. In the case of closing the second current switch 188 to clamp a negative half cycle 174, a current path is established from the upper output node 180 through the closed second current switch 188 to the midpoint node 192. From the midpoint node 192 current flows through lower half bridge capacitor 208 to the negative lower input terminal 140 and from the lower input terminal 140 through the fourth diode 200 to the lower output terminal 182. From the lower output terminal 18 current flows through the current sensing transformer 96, primary winding 168, resonator capacitor 166, and resonator inductor 164 of the primary circuit 146 to the upper output node 180. The flow of current through the lower half bridge capacitor 208 tends to charge capacitor 208 and raise the voltage of the midpoint node 192.

If the third current switch 194 is closed to clamp the negative half cycle 174, the current flow path is from the upper output node 188 through the first diode 186 to the positive upper input node 138, and through the upper half bridge capacitor 206 to the midpoint node 192. From the midpoint node 192 the current path is through the third current switch 194 to the lower output node 182 and from there through the current sensing transformer 96, primary winding 168, resonating capacitor 166 and resonator inductor 164 of the primary circuit to the upper output node 180. In the case of closing the third current switch 184, the upper half bridge capacitor 206 is charged, lowering the voltage of the midpoint node 192.

It is apparent that the improved switch 58 configuration shown in FIG. 6, like the H-bridge configuration shown in FIG. 3 achieves drive pulses (176, 178, FIG. 5) in phase with and at the zero magnitude points of the positive and negative half cycles (172, 174, FIG. 4) by alternately closing pairs of current switches. Similarly, the clamping condition with both switch configurations is achieved by closing one switch of two pairs of switches, and by alternating the selection of the switches in each pair to clamp on positive and negative half cycles. Further still, alternating the alternate closing of the two switches in each pair during clamping conditions distributes the heat absorption to create greater reliability from a reduced likelihood of damage.

Details of the voltage control differential amplifier 84 and its associated filter and proportioning circuit 92 are described and shown in FIG. 7. It should be understood that the description of the amplifier 84 and circuit 92 is also applicable to the current control differential amplifier 102 (FIG. 2) and its associated filter and proportioning circuit 106 (FIG. 2).

The differential amplifier 84 is a conventional voltage responsive differential amplifier having a positive, or non-inverting, input terminal 210 and a negative, or inverting, input terminal 212. An error output signal 214 from the differential amplifier 84 is the algebraic difference between the signal applied to the positive input 210 and the signal applied to the negative input 212. The positive input terminal 210 is connected to receive the voltage control set point signal 82 which is generated by the processor 70 (FIG. 2). The voltage feedback signal 88, which is proportional to the high voltage feedback signal 74 from the rectifier 66 (FIG. 2), is applied to the negative input terminal 212. Ignoring the effects of the filter and proportioning circuit 92, the error output signal 214 is representative of the amount the actual voltage at the rectifier 66 (FIG. 1) differs from the set point signal 82.

The filter and proportioning circuit 92 modifies the response of the differential amplifier 84 so that the error output signal 214 has a proportional term and integral term. The proportional term is proportional to the difference between the voltage set point command signal 82 and the voltage feedback signal 88. The integral term represents an integration of the difference over time, and is this proportional not only to the magnitude of the difference but also to how long the difference has persisted.

The filter and proportioning circuit 92 is a network of input resistors 216 and 218, feedback resistors 216, 220 and 222, and a feedback capacitor 224. The feedback capacitor 224 introduces the integral term into the output signal 214. The input resistors 216 and 218 and the feedback resistors 216, 220 and 222 determine a gain value of the proportional term. The actual output error signal 214 of the amplifier 82 with the filter and proportioning circuit 92 will be an algebraic difference between the signals 82 and 88, multiplied by a transfer function that is an effective feedback impedance determined by the feedback resistors 216, 220 and 222 and the feedback capacitor 224, divided by an effective input impedance determined by the input resistances 216 and 218.

For differing operating conditions, such as different values of the voltage set point command signal 82, it is desirable to change the transfer function of the circuit 92. The change is accomplished by adding an additional feedback resistor 226 or an additional feedback capacitor 228, or both, or changing the circuit configuration of the elements, or adding other circuit elements in different configurations, in the filter and proportioning circuit 92, thereby changing the effective feedback impedance. The additional feedback resistor 226 and additional feedback capacitor 228 are selectably connected to the filter and proportioning circuit 92 by closing an analog switch 230 in response to the control signal 94 from the processor 70 (FIG. 2). A plurality of analog switches 230, additional feedback resistors 226 and additional feedback capacitors 228 are preferably provided, which can selectively add impedances to the filter and proportioning circuit 92 in various combinations, thereby modifying the transfer function of the amplifier 84 as desired. An output voltage limiter, such as a zener diode 232 or a voltage limiting transistor, limits the output signal 214 to a maximum value to prevent over driving the voltage output of the high voltage rectifier 66 (FIG. 1).

The half cycle current detector 98 is described in more detail in conjunction with FIG. 8. The current feedback signal 76, which represents the current flowing in the resonant primary circuit, is fed through a current sensing transformer 236 which converts the current feedback signal 76 to levels compatible for use by the half cycle current detector 98. The secondary winding 238 of the current sensing transformer 236 is connected between a positive sensing node 240 and a negative sensing node 242. The positive sensing node 240 serves as an input node for a positive half cycle current detector 244 and the negative input node 242 serves as a current input node for a negative half cycle current detector 246. The positive half cycle detector 244 derives a voltage signal 248 which is proportional to the current flowing during the positive half cycle 172 (FIG. 4) in the resonant primary circuit 146. The negative half cycle current detector 246 produces a voltage output signal 250 which is proportional to the current flowing during the negative half cycle 174 (FIG. 4) in the resonant primary circuit 146. The voltage signal 248 from the positive half cycle current detector 244 is alternated with the voltage signal 250 from the negative half cycle current detector 246 to produce the current level signal 100 which is applied to the current control differential amplifier 102 (FIG. 2).

The positive half cycle current detector 244 and the negative half cycle current detector 246 have identical circuit configurations and functionality. The positive half cycle current detector 244 will be described in detail, it being understood that the negative half cycle current detector 246 is identical to the positive half cycle current detector 244 except for timing of the signals 136.

In the positive half cycle current detector 244 a first diode 252 is connected between a reference ground potential 254 and the positive half cycle sensing node 240. The first diode 252 is oriented to conduct current only from the ground reference potential 254 to the positive sensing node 240, blocking current flow in the opposite direction. A second diode 256 is connected between the positive sensing node 240 and a first reference voltage node 258. The second diode 256 is oriented to conduct current only from the positive sensing node 240 to the first reference voltage node 258, blocking the flow of current in the opposite direction. The first and second diodes 252 and 256, respectively, cooperate with similarly oriented third and fourth diodes 260 and 262, respectively, of the negative half cycle current detector 246 to direct positive half cycles of current from the transformer 236 to the positive half cycle current detector 244 and to direct negative half cycles of current from the transformer 236 to the negative half cycle current detector 246. The positive half cycles of current from the transformer 236 represent the magnitude of the positive half cycles of current in the resonant primary circuit 146 and the negative half cycles of current from the transformer 236 represent the magnitude of the negative half cycles of current in the resonant primary circuit 146.

A first capacitor 264 is connected between the ground reference potential 254 and the first reference voltage node 258. A field effect transistor (FET) switch 266 is also connected between the ground reference potential 254 and the first voltage reference node 258. The FET switch 266 responds to a signal 136a from the timing calculation circuit 134 (FIG. 2). The first reference voltage node 258 is connected to a second reference voltage node 268 through a first analog switch 270. The first analog switch 270 is controlled by a signal 136b from the timing calculation circuit 134 (FIG. 2). A second capacitor 272 is connected between the second reference voltage node 268 and the ground reference potential 254. The second voltage reference node 268 is connected to a buffer operational amplifier 274 to supply the positive half cycle voltage signal 248. The positive half cycle signal 248 is supplied as the current level signal 100 through a second analog switch 276. The second analog switch 276 is actuated by a signal 136c from the timing calculation circuit 134 (FIG. 2).

The operation of the positive half cycle current detector 244 will be explained by reference to a time axis of the positive and negative half cycles of resonating current 172 and 174 (FIG. 4). For purposes of this discussion, the time for a full cycle of the current 172 and 174 is described as a 360 degree cycle with the positive half cycle 172 beginning at zero degrees and ending at 180 degrees and with the negative half cycle 174 beginning at 180 degrees and ending at 360 degrees.

At the zero degree point the FET switch 266 and the first and second analog switches 270 and 276, respectively, are held Open by the signals 136a, 136b and 136c, respectively. The signal representative of the positive half cycle 172 is prevented from influencing the negative half cycle detector 246 by the action of the first diode 252 and the fourth diode 262, but this signal flows to the positive half cycle current detector 244 through the second diode 256 and the third diode 260, charging the first capacitor 264. The charging of the first capacitor 264 causes the voltage of the first voltage reference node 258 to rise in proportion to the integral of the current flow during the positive half cycle as is illustrated by the waveform diagram in FIG. 9. The capacitor 264 reaches its maximum charge and holds it to the end of the positive half cycle 172, at the 180 degree point. When current flow reverses with the beginning of the negative half cycle at the 180 degree point, the charge on the capacitor 264 and thus the voltage of the first voltage reference node 258, is prevented from discharging by the first and second diodes 252 and 256.

The voltage of the first voltage reference node 258 is thus held constant at its maximum value past the 180 degree point.

At a time subsequent to the 180 degree point, the signal 136b closes the first analog switch 270 for a period of time as shown in the waveform diagram shown in FIG. 13. The switch 270 is closed long enough for the charges on the first capacitor 264 and the second capacitor 272 to equalize. The capacitance value of the capacitor 272 is very small compared to the value of the capacitance value of capacitor 258, so after the charge equalizes, the voltage across capacitor 272 is essentially the same as the voltage across capacitor 258 prior to equalization. In the preferred embodiment, the signal 136b and thus the closing of the first analog switch 270, begins at approximately 263 degrees and ends at approximately 277 degrees. The voltage level established at the second reference voltage node 268 is transmitted through the buffer operational amplifier 274.

After the charge on the first capacitor 264 and the second capacitor 272 has equalized, the signal 136c (illustrated by the waveform diagram in FIG. 14) causes the second analog switch 276 to close. In the preferred embodiment the switch 276 closes simultaneously with the opening of the first analog switch 270. The charge on the second capacitor 27 is prevented from interacting with the first capacitor 264 by the open first analog switch 270. The second analog switch 276 remains closed for a 180 degree period, establishing the signal 248 as the voltage level of the current level signal 100 as illustrated in FIG. 19, for the positive half cycle.

After the first analog switch 270 opens, at approximately 301 degrees in the preferred embodiment, the signal 136a (FIG. 15), causes the FET switch 266 to close for a period of time sufficient to discharge the first capacitor 264. The first capacitor 264 discharges through the FET switch 266, thereby bringing the voltage of the first voltage reference node 25 to the voltage of the ground reference potential 254 (FIG. 9). In the preferred embodiment this period of time is approximately 34 degrees. The signal 136a (FIG. 15) causes the FET switch to open before the beginning of the next positive half cycle 172 at 360 or zero degrees.

The negative half cycle current detector 246 functions identically to the positive half cycle current detector except that signals 136d, 136e and 136f, and the voltage changes at the nodes 278 and 280, are 180 degrees out of phase with the signals 136a, 136b and 136c and the voltage changes at nodes 258 and 278, respectively, which is illustrated by comparing the waveform diagrams in FIGS. 9 and 10, 11 and 12, 13 and 16, 14 and 17 and 15 and 18. In the positive half cycle detector 244, the capacitor 264, diodes 256 and 260 and the primary winding 238 are one example of a positive sampling and holding means; the switches 270 and 276 are one of many examples of transfer means for transferring the signal from one point in the detector 244 to another; and the FET switch 266 is one example of reset means for terminating the signal across the capacitor 264 at the appropriate time. The comparable elements are examples of the same arrangements in the negative half cycle detector 246.

The second analog switch of the positive half cycle current detector 244 and the second analog switch 282 of the negative half cycle current detector 246 are open and closed in an alternating fashion, each switch being closed for 180 degrees and open for 180 degrees, with the switches not being simultaneously closed at any time. The voltage level of the current level signal 100 thus alternately takes on a value representative of the positive half cycle current 172 and the negative half cycle current 174 to form an analog signal, as illustrated by the waveform diagram in FIG. 19. The current level signal 100 changes during each half cycle when the resonant primary current changes.

Details regarding the algorithmic controller 110 will be described in conjunction with FIGS. 20, 21, 22 and 23. The algorithmic controller 110 responds to the control output signal 104 and controls the switch selector 114 (FIG. 2) to supply predetermined patterns of drive or clamp signals 116 (FIG. 2) to achieve the desired degree of power regulation.

Each of the embodiments of the algorithmic controller 110 described in conjunction with FIGS. 20 to 23 may prove useful in different applications of the present invention. In general however, it has been discovered that producing a greater frequency of alternating drive and clamp conditions results in a finer or more precise ability to achieve power regulation with reduced effects from overshoot or hunting. The higher frequency of alternating drive and clamp conditions continually perturbs the control feedback only very slightly about the desired control point, and makes any significant departure from the desired control point more readily apparent as a significant change. A quicker response to the changing conditions is more easily generated with less responsive time lag than if the feedback control operated in a more uniform and less perturbed condition. In a non-perturbed and more uniform or stable condition, it is more difficult to respond quickly to a significant change without creating overshoot and hunting in the regulation. The relatively high frequency of the drive and clamp conditions is therefore desired and is desirable from all embodiments of the algorithmic controller 110, although some of the embodiments achieve higher frequencies of alternating drive and clamp conditions than others.

One embodiment of the algorithmic controller 110 is described in conjunction with FIG. 20. The control output signal 104 from the current control differential amplifier 102 (FIG. 2) is connected to a positive input of a differential amplifier 290. The output algorithmic signal 112 of the differential amplifier 290 is fed back through a filtering and proportioning circuit comprising two feedback resistors 292 and 294 and a feedback capacitor 296, which produce a compensated feedback signal 298 which is supplied to the inverting input of the differential amplifier 290. The values of the feedback resistors 292 and 294 and the feedback capacitor 296 are selected so that the compensated feedback signal 298 approximates an average of previous outputs 112 from the differential amplifier 290 over a predetermined time period. The control output signal 104 is compared to the time period average of the previous outputs from the differential amplifier 290, represented by the signal 298. If the control output signal 104 is higher than the compensated feedback signal 298, the output signal of the differential amplifier 112 is positive or high, calling for a drive condition. If the control output signal 104 is lower than the compensated feedback signal 298 the output signal of the differential amplifier 112 will be negative or zero or low indicating a clamp condition. The algorithm output signal 112 of the algorithmic controller 110 is transmitted to the switch selector 114 which interprets a positive polarity of the algorithm output signal 112 as a drive condition, thereby generating appropriate drive signals 116 (FIG. 2) and transmitting them to the switch 58. A negative polarity or low level algorithm output signal 112 is interpreted as a clamp condition by the switch selector 114 which then generates an appropriate clamp signal 116 (FIG. 2) and transmits it to the switch 58.

A second alternative embodiment of the algorithmic controller 110 is described in conjunction with FIG. 21. The second alternative embodiment of the algorithmic controller 110 includes a comparator or differential amplifier 300. The positive input of the differential amplifier 300 is connected to receive the control output signal 104 from the current control differential amplifier 102 (FIG. 2). The algorithm output signal 112 of the differential amplifier 300 is fed back to the negative input of the differential amplifier 300 through a feedback compensation network. The feedback compensation network includes a shift register 302 and resistive network 304. The shift register 302 and network 304 derive a weighted average of algorithm output signals 112 generated during a predetermined number of previous half cycles. The weighted average signal 306 is fed to the negative input of the differential amplifier 300 from the shift register 302 and the resistive network 304. If the control output signal 104 is greater than the weighted average signal 306, the amplifier 300 supplies a high or positive algorithm output signal 112, which the switch controller 114 interprets as a drive condition. If the control output signal 104 is less than the weighted average signal 306, the amplifier 300 supplies a low or negative algorithm output signal 112, which the switch controller 114 interprets as a clamp condition.

The shift register 302 is clocked by the phase signal 126 from the zero crossing detector 128 (FIG. 2), to synchronize the shift action of the shift register 302 with the half cycles 172 and 174 (FIG. 4) of the current flowing in the resonant primary circuit. For each sequence of a predetermined number of half cycles 172 and 174 (FIG. 4) the high or low value of the algorithm output signal 112 is shifted into corresponding output terminal positions 308 of the shift register 302. Each subsequent half cycle moves the values sequentially through the output terminal positions 308, with the new value of the algorithm output signal 112 added at the first output terminal position and the oldest value of algorithm output signal deleted from the last output terminal position. Resistors 310 are connected to each output terminal 308. When a high value is present at an output terminal 308, it will contribute to the value of the weighted average signal 306 in direct relation to the value of the resistor connected to the output terminal 308. A low signal at an output terminal 308 does not create any effect on the signal 306. The values of the resistors 310 in the resistive network 304 are selected so that more recent values are given relatively more weight and older values are given relatively less weight. By weighting the more recent values more heavily, a bias in favor of the most recent control effects is achieved. The bias toward the most recent condition diminishes the possibility for significant substantial changes.

Whenever the control output signal 104 is greater than the weighted average signal 298, the algorithm output signal 112 is positive. The switch selector 114 will interpret the positive algorithm output signal 112 as a drive condition and will transmit an appropriate drive signal 116 (FIG. 2) to the switch 58 (FIG. 2). When the control output signal 104 is less than the weighted average signal 398, the algorithm output signal 112 is negative. The switch selector 114 will interpret the algorithm output signal 112 as a clamp condition, and the switch selector 114 will transmit an appropriate clamp signal 116 (FIG. 2) to the switch 58 (FIG. 2).

A third alternative embodiment of the algorithmic controller 110 is described in conjunction with FIG. 22. The control output signal 104 is transmitted to a level detector 312. The level detector 312 categorizes the value of the control output signal 104 as being within one of a predetermined plurality of ranges of possible output values and generates a level output signal 314 that is a discrete signal indicative of the range within which the control output signal 104 falls.

A selectable pattern generator 316 receives the level output signal 314 and produces the algorithm output signal 112 in response thereto. The algorithm output signal 112 represents a predetermined programmed sequence of clamp and drive conditions for each discrete value of the level detector output signal 314. The selectable pattern generator 316 responds to the clock output signal 126 from the zero crossing detector 118 (FIG. 2) to transmit the predetermined pattern of drive and clamp conditions in synchronism with the phase signal 126. The switch selector 114 then generates clamp and drive signals 116 (FIG. 2) and transmits them to the switch 58 (FIG. 2) to cause switch to drive and clamp the resonant primary circuit corresponding to the pattern of drive and clamp conditions presented by the selectable pattern generator 316.

A fourth alternative embodiment of the algorithmic controller 110 is illustrated in FIG. 23. The control output signal 104 is fed into a analog-to-digital converter 320. The analog-to-digital converter 320 converts the analog control output signal 104 to a digital number 322 representative of the value of the control output signal 104. This digital number 322 is transmitted to a conventional binary rate multiplier 324. The binary rate multiplier converts the digital number produced by the analog to digital converter 320 into a series of pulses. The series of pulses is transmitted as the algorithm output signal 112 of the algorithmic controller 110 through the switch selector 114. As the control output signal 104 increases in value the rate at which pulses are generated by the binary rate multiplier 324 will increase, increasing the number of pulses in the algorithm output signal 112. As the number of pulses increase, the switch selector 114 commands relatively more drive conditions relative to the number of clamp conditions, thus increasing the voltage level at the output of the rectifier 66 (FIG. 2). Conversely a decrease in the value of the control output signal 104 will result in a decreasing number of pulses transmitted by the algorithm output 112 from the binary rate multiplier 324 to the switch selector 114, which will result in relatively fewer drive conditions relative to clamp conditions being transmitted by the switch selector 114, resulting in a lowering of the output voltage from the high voltage rectifier 66 (FIG. 2).

Details regarding the preferred embodiment of the switch selector 114 are described in conjunction with FIGS. 6, 24A and 24B. The switch selector illustrated in FIGS. 24A and 24B includes features particularly adapted for use with the improved switch 58 configuration illustrated in FIG. 6 and described above. It should be understood however, that by omission of those features particularly adapted for use with the improved switch 58 illustrated in FIG. 6, the switch selector 114 may also be used with the conventional H-bridge switch configuration illustrated in FIG. 3. The feature of the switch selector 114 particular to the switch shown in FIG. 6 relates to balancing the bias midpoint voltage 192.

The switch selector 114 is preferably implemented in a programmable array logic (PAL) to achieve the desired logical functionality. This logical functionality is illustrated by the logic gates and other elements shown in FIGS. 24A and 24B. The phase signal 126 from the zero crossing detector 118 (FIG. 2) is used as a reference signal to synchronize the operation of the switch selector 114 with the positive and negative half cycles of resonant current 172 and 174 (FIG. 4). The phase signal 126 has high value during the positive half cycle 172 (FIG. 4) of the resonant current a low value during the negative half cycle 174 (FIG. 4).

The algorithm output signal 112 is connected to one input terminal of each of four OR gates 330a, 330b, 330c and 330d. An output terminal of each OR gate 330a, 330b, 330c and 330d is connected to an associated flip-flop 332a, 332b, 332c and 332d, respectively. The output terminals of each flip-flop 332a, 332b, 332c and 332d are each connected to one input terminal of an associated AND gate 334a, 334b, 334c and 334d, respectively. The phase signal 126 is inverted by an inverter 336 to create a true phase signal 126 and a complementary phase signal 126'. The true phase signal 126 is applied to the input terminals of the AND gates 334a and 334d. The complementary phase signal 126' is applied to the input terminals of the other two AND gates 334b and 334c. A clock circuit 358 responds to the true phase signal 126 and the complementary phase signal 126' and supplies a clock signal 359 for clocking the flip-flops 332a, 332b, 332c and 332d in accordance with the level of the signal applied from the OR gates 330a, 330b, 330c and 330d to the D input terminals. The clock signal 359 presents a positive level each time the phase signal 126 transitions between levels, i.e. at each half cycle of current 172 and 174 (FIG. 4). The clock signal 359 thereby synchronizes the transitions between logical states of the switch controller 114 with the transitions between the positive and negative half cycle of resonating current in the resonant primary circuit.

The presence of a high algorithm output signal 112 indicates the need to create a drive condition. The high level signal 112 is transferred through the OR gates 330a, 330b, 330c and 330d, to the D input terminals of the flip-flops 332a, 332b, 332c and 332d. The flip-flops 332a, 332b, 332c and 332d are triggered and supply a high output signal in conjunction with the clock signal 359. The high output signals from the flip-flops are present at the input terminals of the AND gates 334a, 334b, 334c and 334d. If the true phase signal 126 is high during the time that the algorithm output signal is also high, indicating that a positive half cycle 172 (FIG. 4) of current is resonating in the resonant primary circuit, the high true phase signal 126 causes the AND gates 334a and 334d to supply high-level drive signals 116a and 116d, respectively. The drive signals 116a and 116d turn on the current switches 184 and 198 of the switch 58 (FIG. 6), or the current switches 148 and 160 of the switch 58 (FIG. 3), respectively, to create a positive drive pulse 176 (FIG. 5). If the phase signal 126 is low during the time that the algorithm output signal 112 is high, indicating that a negative half cycle 174 (FIG. 4) of current is resonating in the resonant primary circuit, the high complementary phase signal 126' causes the AND gates 334b and 334c to supply high-level drive signals 116b and 116c, respectively. The drive signals 116b and 116c turn on the current switches 194 and 188 of the switch 58 (FIG. 6), or the current switches 152 and 156 of the switch 58 (FIG. 3), respectively, to create a negative drive pulse 178 (FIG. 5).

The presence of a low algorithm output signal 112 indicates the need to create a clamp condition. As previously discussed in conjunction with switches 58 shown in FIGS. 3 and 6, it is desirable to alternate the conduction of each pair of current switches during each half cycle clamping condition to distribute the heating generated during clamping. In order to obtain this alternating function, an alternating circuit 342 is provided. Output signals 344 and 346 from the alternating circuit 342 always occupy respectively opposite (high or low) states. Each signal 344 and 346 normally toggles between high and low states with each successive clamp condition. In the circumstance where the half bridge capacitors 206 and 208 (FIG. 6) must be charged to restore the midpoint voltage of the node 192 between the voltages at nodes 138 and 140 (FIG. 6), the toggling stops and the appropriate one of the half bridge capacitors 206 or 208 is charged until the desired midpoint voltage level is restored. A voltage balancing circuit 347 supplies balance control signals 350, 351 and 352 which override the alternating conductive effect created during clamp conditions, until the necessary midpoint voltage 192 across the two half bridges capacitors 206 and 208 of the switch 58 (FIG. 6) is restored.

The AND gates 340a, 340b, 340c and 340d and the alternating circuit 342 are the logical elements which primarily create the alternating clamping effect. The AND gates 356a, 356b, 356c and 356d and the voltage balancing circuit are the primary elements which disable the alternating clamping effect and establish a consistent clamping pattern which results in restoring the midpoint voltage of the half bridge balancing capacitors.

A clamping condition is indicated upon a low algorithm output signal 112. The algorithm output signal 112 is inverted by the inverter 338 to generate a high complementary algorithm output signal 112' when the clamping condition is indicated. The complimentary signal 112' is applied to one input terminal of each of the AND gates 340a, 340b, 340c and 340d. The AND gates 340a and 340c receive the first alternating output signal 344 from the alternating circuit 342 at their input terminals. The input terminals of the AND gates 340b and 340d are connected to receive the second alternating output signal 346 from the alternating circuit 342. The third input signal 351 from the voltage balancing circuit 347 is high when the midpoint voltage point (192, FIG. 6) is within a predetermined acceptable range. The high signal 351 enables the AND gates 340a, 340b, 340c and 340d to respond logically to create the alternating clamping condition.

The output signals of the AND gates 340a, 340b, 340c and 340d are each connected to the input terminal of an associated OR gate 330a, 330b, 330c and 330d. For any clamp condition, a single clamp signal 116a, 116b, 116c or 116d will be enabled depending on the effect of the phase signal 126 on the AND gates 334a, 334b, 334c and 334d, and depending upon the effect of the alternating output signals 344 and 346 on the AND gates 340a, 340b, 340c and 340d.

If a clamp condition is indicated when the first alternating output signal 344 is high and the second alternating output signal 346 is low, the AND gates 340a and 340c will be enabled and the other two AND gates 334b and 334d will be disabled. The output signals of the enabled AND gates 334a and 334c are passed by the associated OR gates 330a and 330c and the flip-flops 332a and 332c to the inputs of the AND gates 334a and 334c. When the high true phase signal 126 indicates a positive half cycle, only AND gate 334a will transmit the clamp signal 116a. When a negative half cycle is indicated by the presence of a high complementary phase signal 126' under these same circumstances, the AND gate 334c will transmit the clamp signal 116c.

If a clamp condition is indicated when the second alternating output signal 346 is high and the first alternating output signal 344 is low, the AND gates 340b and 340d will be enabled and the other two AND gates 334a and 334c will be disabled. The output signals of the enabled AND gates 334b and 334d are passed by the associated OR gates 330b and 330d and the flip-flops 332b and 332d to the inputs of the AND gates 334b and 334d. When the high true phase signal 126 indicates a positive half cycle, only AND gate 334d will transmit the clamp signal 116d. When a negative half cycle is indicated by the presence of a high complementary phase signal 126' under these same circumstances, the AND gate 334b will transmit the clamp signal 116b.

The state of the first and second alternating output signals 344 and 346 only toggle with each sequential execution of a clamping condition, even if the sequential executions are interspersed with drive conditions. This functionality is achieved by an OR gate 343 which receives an input signal from one of the AND gates 340a, 340b, 340c or 340d whenever an alternating clamping condition is indicated. The high output signal from the OR gate 343 under these conditions is supplied to an inverter 345 where it is inverted and supplied to one input terminal of an AND gate 347. The signal from the OR gate 343 is also applied to one input terminal of an AND gate 349. The other input signals to the AND gates 347 and 349 ar the first and second alternating output signals 344 and 346, respectively.

Assuming that the first signal 344 is high and the second signal 346 is low, neither AND gate 347 or 349 will cause a high signal to the D input terminal of the flip-flop 360. Thus the next clock signal 359 will change the state of the flip-flop 360 and the state of the first and second alternating output signals 344 and 346 will reverse. With the first signal 344 low and the second signal 346 high, the AND gate 349 will supply a high level signal through the OR gate 351 to the D input terminal of the flip-flop 360. With the next clock signal 359, the state of the flip-flop and the signals 344 and 346 will again change. Thus with each signal from the OR gate 343 indicating a clamping condition, the state of the alternating output signals 344 and 346 toggles or changes.

However when drive conditions are interspersed between clamping conditions, state of the signals 344 and 346 is maintained during the drive conditions. During drive conditions, the OR gate 343 does not supply an output signal. If the first signal 344 is high and the second signal 346 is low, the AND gate 349 and the OR gate 351 will supply a high signal to the D input terminal of the flip-flop 360. The flip-flop 360 will maintain and not change the high level of the signal 344 with each clock pulse 359. On the other hand if the first signal 344 is low and the second signal 349 is high, neither the AND gate 347 or 349 will supply a high signal and as a result, a low signal will be supplied to the D input terminal of the flip-flop 360. The flip-flop 360 will maintain and not change the high level of the signal 346 with each clock pulse 359. Thus the alternating circuit 342 maintains the alternating nature of the clamping conditions with respect to the last occurring clamping condition, even during the intervention of driving conditions.

When the voltage balancing circuit 347 indicates that the midpoint voltage is out of acceptable limits, the signal 351 goes low and disables the AND gates 340a, 340b, 340c and 340d. Under this condition the AND gates 356a, 356b, 356c and 356d control the derivation of the clamp signals.

The voltage balancing circuit 347 includes a window comparator 348 which is connected to the positive upper input node 138, the midpoint node 192, and the negative lower input node 140 of the improved switch 58 shown in FIG. 6. The window comparator 348 compares the magnitude of the voltage between the upper input node 138 and the midpoint node 192 with the magnitude of the voltage between the midpoint node 192 and the lower input node 140. If the voltage between the upper input node and the midpoint node 19 exceeds the voltage between the midpoint node and the lower input node 140 by more than a predetermined amount, a signal 350 is generated which represents that the voltage across the upper half of the bridge (capacitor 206, FIG. 6) is too high. If the voltage between the midpoint node 192 and the lower input node 140 exceeds the voltage between the upper input node 138 and the midpoint node 192 by more than a predetermined amount, the window comparator 348 generates a signal 352 which represents that the voltage across the lower half bridge (capacitor 208, FIG. 6) is too high.

The signals 350 and 352 are applied to the two input terminals of a NOR gate 354. The output signal 351 of the NOR gate 354 is connected to the input terminals of the AND gates 340a, 340b, 340c and 340d, to enable those AND gates when neither signal 350 or 352 is present thus indicating an acceptable within-limits condition of the midpoint voltage across the bridge halves. The complementary algorithm output signal 112' is applied to one input terminal of each of four AND gates 356a, 356b, 356c and 356d. The output signal of each AND gate 356a, 356b, 356c and 356d is connected to an input terminal of an associated one of the OR gates 330a, 330b, 330c and 330d, respectively. The signal 350 is connected to the input terminal of the AND gates 356a and 356c. The signal 352 is connected to the input terminals of the AND gates 356b and 356d.

If the voltage across the upper half of the bridge is too high as indicated by a high signal 350 and a low algorithm output 112 signal is calling for a clamp condition, the signal 350 and the complementary clamp signal 112' cause AND gates 356a and 356c to supply high output signals. These output signals are passed by the associated OR gates 330a and 330c and associated flip-flops 332a and 332c to the input terminals of the AND gates 334a and 334c. When the true phase signal 126 indicates a positive half cycle 172 (FIG. 4) of resonant current flow, the AND gate 334a supplies a clamp signal 116a to cause the current switch 184 (FIG. 6) to conduct during the clamping condition. When the complementary phase signal 126' indicates a negative half cycle 174 (FIG. 4) of resonant current flow, the AND gate 334c supplies a clamp signal 116c to cause the current switch 188 (FIG. 6) to conduct during the clamping condition. As discussed previously, using current switch 184 to clamp a positive half cycle of current or using current switch 188 to clamp a negative half cycle of current will tend to raise the voltage of the midpoint node 192, thereby tending to correct a condition wherein the voltage between the upper input node 138 and the midpoint node 19 is greater than the voltage between the midpoint node 192 and the lower input node 140.

If the voltage across the lower half of the bridge is too high as indicated by a high signal 352 and a low algorithm output 112 signal is calling for a clamp condition, the signal 352 and the complementary clamp signal 112' cause AND gates 356b and 356d to supply high output signals. These output signals are passed by the associated OR gates 330b and 330d and associated flip-flops 332b and 332d to the input terminals of the AND gates 334b and 334d. When the true phase signal 126 indicates a positive half cycle 172 (FIG. 4) of resonant current flow, the AND gate 334d supplies a clamp signal 116d to cause the current switch 198 (FIG. 6) to conduct during the clamping condition. When the complementary phase signal 126' indicates a negative half cycle 174 (FIG. 4) of resonant current flow, the AND gate 334b supplies a clamp signal 116b to cause the current switch 194 (FIG. 6) to conduct during the clamping condition. As discussed previously, using current switch 198 to clamp a positive half cycle of current or using current switch 194 to clamp a negative half cycle of current will tend to lower the voltage of the midpoint node 192, thereby tending to correct a condition wherein the voltage between the upper input node 138 and the midpoint node 192 is less than the voltage between the midpoint node 192 and the lower input node 140.

Each one of the current switches of the switch 58 incorporates a current limiter circuit 364, described in conjunction with FIG. 25. The current limiter circuit protects the current switch from damage due to excessive currents and excessive rates of change in current. The current limiter circuit 364 is described as it relates to one of the current switches 184 of the improved switch 58 illustrated in FIG. 6. It should be understood, however, that the current limiter circuit 364 is equally applicable to the current switches of the conventional H-bridge switch illustrated in FIG. 3.

The operative element of the current limiter switch 364 for each current switch is a MOS-FET 366 connected in series with a Schottky diode 368. A current sensing transformer 370 is connected in series with the MOS-FET 366 to convert the level of the current flowing in the MOS-FET 366 to current and voltage value usable by the current limiting circuit 364. One terminal of the secondary winding of the current sensing transformer 370 is connected to reference potential 374. A diode 376 is connected between the other terminal of the secondary winding 372 and an input node 378. The diode 376 is oriented to only conduct current from the secondary winding 372 to the input node 378. A scaling resistor 380 is connected between the input node 378 and the reference ground potential 374. Current flowing through the diode 376 and the signal scaling resistor 380 creates a voltage signal at the input node 378. The voltage at the input node 378 with respect to the reference ground potential 374 is proportional to the current sensed by the sensing transformer 370.

The input node 378 is connected to a positive input terminal of a conventional Norton amplifier 382 through a parallel combination of a current limit resistor 384 and a rate-of-rise limit capacitor 386. The current limit resistor 384 passes a signal from the input node 378 to the positive input of the Norton amplifier 382 that is proportional to the absolute value of the current detected by the current sensing transformer 370. The current limit capacitor 386 passes a signal from the input node 378 to the positive input terminal of the Norton amplifier 382 that is a derivative of the current. This signal is related to the rate at which the current sensed by the current sensing transformer 370 is changing.

A set point resistor 388 is connected between a source 390 of reference voltage and a negative input terminal of the Norton amplifier 382. A set point current value is established by the reference voltage 390 and set point resistor 388. An output signal 392 from the amplifier 382 is proportional to the difference between the set point value and a value representative of the absolute value of the current sensed by the current transformer 370 plus the rate at which that value is increasing.

A negative or zero output signal 392 from the differential amplifier 382 indicates that the current sensed by the current sensing transformer 370 is within acceptable limits, while a positive output signal 392 indicates the current that exceeds the predetermined safe limits. The output signal 392 of the differential amplifier 382 is delivered to an inverting Schmitt trigger 394 through an inrush limiting resistor 396 and a diode 398. The output signal 400 of the inverting Schmitt trigger 394 is connected to an input terminal of the AND gate 402. Another input signal to the AND gate is the drive or clamp signal 116a from the signal selector 114 (FIG. 2). The signal 116a controls the current switch 184. If the output signal 400 of the inverting Schmitt trigger is high, indicating that the current value plus rate-of-rise value does not exceed the safe limits, the AND gate 402 is enabled, allowing the signal 116a to pass through to the AND gate 402 and buffer amplifier 404 to turn on the MOS-FET 366 of the current switch 184. If, however, the input signal to the inverting Schmitt trigger 394 is high, indicating that the current value exceeds the safe limits, the output signal 400 of the inverting Schmitt trigger 394 will be low. The AND gate 402 will block the signal 116a, thereby disabling the MOS-FET 366.

The differential amplifier 382 output signal 392 also charges a time-delay capacitor 406. Once the time-delay capacitor 406 is charged by the high signal 392, the diode 398 will hold the charge on the capacitor 406 for a predetermined time by preventing the capacitor 406 from discharging when the signal 392 is reduced due to the MOS-FET 36 being opened. The time delay capacitor 406 holds its charge for a predetermined time determined by the value of a parallel discharge resistor 408. The capacitor 396 and resistor 400 make up an RC circuit which cause the input signal to the Schmitt trigger 394 to remain high, and its output signal 400 to remain low for a period of time sufficient to allow the MOS-FET 366 to recover from the deleterious effects of excess current or excess change in current. This time delay has the effect of limiting the frequency of re-try attempts after previous out of limit conditions have been detected. Preferably the time delay is considerably greater than the period of the natural resonant current, such as three or four times greater. With this delay, the frequency of re-try attempts will be at the rate of one third to one fourth of the natural resonant frequency.

An embodiment of the high voltage transformer 64 (FIGS. 2, 3 and 6), which is preferably incorporated in the resonant converter power supply of the present invention, is shown at 420 in FIG. 26. The transformer 420 includes a core 422 formed by a plurality of U-shaped core members 424, each of which is formed of magnetic material. The core members 424 are retained in a facing configuration to form the core 422 in a generally closed loop rectangular configuration with a rectangular center opening 426, as shown in FIG. 27, and with portions of the core forming legs of the core on four sides surrounding the center opening 426. The core members 424 are held in position by a top and a bottom frame plates 428 and 430, respectively. The frame plates 428 and 430 are held together by fasteners such as bolts 432. The frame members 428 and 430 and the bolts 432 are made of electrically insulating material. The number of core members 424 which make up the closed loop core 422 is selected to obtain the desired flux conducting capability. Other configurations than the rectangular closed loop configuration may be acceptable, such as toroidal shapes, but under such circumstances the configuration of other elements of the transformer 420 must be changes as well.

The primary winding 168 (FIGS. 3 and 5) of the transformer 420 is formed by a single, relatively-wide, flat sheet 434 of electrically conductive material, preferably copper. The sheet 434 extends through the opening 426 and makes a single winding or wrap around one side or leg of the closed loop rectangular core 422, as is shown in FIGS. 26 and 28. The flat sheet 434 is utilized to obtain a relatively high current carrying capability, and hence flux generating capability, from a single turn winding. A single turn winding obtains a relatively high step-up in voltage due to the relatively higher number of secondary windings of the transformer 420.

A plurality of printed circuit boards (PCBs) 440 each include conductor traces 442 formed thereon in a continuous, rectangular spiral pattern. Each PCB 440 is formed in a rectangular configuration with a rectangular center opening 444. The spiral pattern of conductor traces 442 surrounds the center opening 444. One side of each PCB 440 and the secondary winding conductor traces 442 extend through the opening 426 in the core 422, as is shown in FIGS. 26 and 27. The conductor traces 442 thus form a single secondary winding of the transformer 420. An insulating plate 448 separates each PCB 440 to provide high voltage insulation between adjacent PCBs. Each insulating plate 448 is formed of high voltage insulating material such as Teflon.

The pattern of traces 442 on each PCB 440 is identical. Accordingly, as is shown in FIG. 29, each of the individual traces 442 forming each secondary winding occupies a similar and uniform adjacent position with respect to the other traces of the adjacent PCBs, which are separated by the insulating plates 448. Accordingly, the amount of voltage gradient or differential which each individual trace 44 experiences relative to each adjacent trace is very predictable due to the uniform pattern of predictable distances between traces. By determining the maximum voltage gradient between adjacent traces, the desired amount of insulation necessary to withstand the voltage gradient can also be predicted and provided by the separation of the conductor traces on each PCB and the thickness of the insulating plate 448. Thus, the use of the PCB secondary windings has the advantage of obtaining a relatively exact position for each of the conductors as is shown in FIG. 29.

The amount of insulation needed is established by this position and the expected voltage gradient between the traces. The PC secondary windings also avoid those situations where, due to a random or less controlled positioning of each of the individual secondary windings, an unexpected voltage gradient may cause an insulation breakdown and failure of the transformer.

Another advantage of the exact positioning of the PCB secondary winding trace conductors is that the amount of interwinding capacitance between the adjacent secondary winding trace conductors can be precisely determined and minimized because of the precision of positioning. The secondary interwinding capacitance is related to the voltage gradient between adjoining conductors and the spacing and size between the conductors. Because this voltage gradient and positioning is known and controlled due to the precise positioning of the PCB conductor traces, there is less likelihood that variable stray capacitances may result in greater charging or voltage gradients and thereby cause unexpected insulation breakdowns.

The use of the single sheet conductor primary winding 434 also obtains substantial advantages. By making the primary winding as a single conductive sheet, a relatively large current carrying capacity is obtained. A compactness in size is maintained by the sheet winding 434, as is shown in FIG. 28, while still allowing the PCB secondary windings and insulator plates to fit within the center opening 426 in the core 422. Lastly, and perhaps most importantly, the very significant primary to secondary interwinding capacitance is minimized. As is shown in FIG. 28, only a relatively small area exists along the extent of the opening 426 and leg of the core adjacent to the secondary windings. The primary to secondary interwinding capacitance is directly related to the area between the primary winding and the secondary winding. By minimizing that area, the interwinding capacitance is also minimized. The primary to secondary interwinding capacitance can be a relatively significant parasitic loss in a high voltage power transformer, due to the high voltage gradient therebetween, and it is important in achieving high efficiency to minimize this interwinding capacitance loss.

The single sheet 434 primary winding offers substantial advantages over forming the primary winding as conductive traces on a PCB, for example. If a PCB primary winding was used, the PCB upon which the primary winding would be positioned would be adjacent to the PCB secondary windings, in much the same manner that two secondary winding PCBs 440 are positioned as shown in FIG. 26. In such circumstances the adjacency of the primary and secondary PCBs would overlap each other with a considerable area and therefore present a relatively large parasitic primary to secondary interwinding capacitance. Substantial reductions in efficiency would result.

The voltage derived by each of the PCB secondary windings is conducted through conductors 450 to other high voltage elements such as storage capacitors and rectifiers (not shown) which are attached on a rear mounting plate 452 located adjacent to the assembly of PCBs 440 and insulating plates 448. The mounting plate 452 may also include the necessary conductors for linking each of the PCB secondary windings in series to obtain a greater number of secondary windings than may be achieved by a single PCB. Alternatively, the voltage obtained from each of the secondary windings may be rectified and the rectified voltages from each winding is connected in series to obtain the desired degree of voltage increase.

Presently preferred embodiments of the invention and many of its improvements have been described with a degree of particularity. This description has been made by way of preferred example and is based on a present understanding of knowledge available regarding the invention. It should be understood, however, that the scope of the present invention is defined by following claims, and is not necessary limited by the foregoing detailed description of the presently preferred embodiments.

I claim:

1. A resonant power supply comprising:
   a transformer having a primary winding and a secondary winding;
   a resonant primary circuit including the primary winding in which a natural resonant current oscillates at a natural frequency in alternate positive and negative half cycles; and
   switch means connected to the resonant primary circuit, the switch means driving current pulses to the resonant primary circuit in phase with and substantially only during the full duration of the positive and negative half cycles, the switch means further clamping to allow the natural resonant current to decay in magnitude substantially only during the full duration of the positive and negative half cycles, the switch means selectively alternatively driving or clamping commencing and ending substantially at each zero magnitude of the natural resonant current.

2. A resonant power supply as defined in claim 1 further comprising:
   determining means responsive to each positive and each negative half cycle of resonant current for determining a driving condition or a clamping condition on a half-cycle by half-cycle basis and for supplying a drive signal representative of a driving condition and for supplying a clamp signal representative of a clamping condition; and wherein:
   the switch means responds to the drive signal by driving current pulses and responds to the clamp signal by clamping the resonant current.

3. A resonant power supply as defined in claim 2 wherein:
   the determining means determines the driving condition or the clamping condition during the half cycle immediately following the half cycle in which the condition existed; and
   the switch means drives the current pulses or clamps the resonant current during the half cycle immediately following the half cycle in which the determination was made.

4. A resonant power supply as defined in claim 3 wherein:
   the determining means responds to a zero magnitude of the resonant current and the maximum magnitude of the resonant current during each positive and negative half cycle.

5. A resonant power supply a defined in claim 2 for applying voltage to an x-ray tube.

6. A resonant power supply as defined in claim 2 wherein the determining means further comprises:
   feedback means responsive to an electrical condition in at least one of the primary or secondary windings and operative for deriving a feedback signal representative of the condition;

means for supplying an other signal related to a desired level of power from the power supply;

comparator means responsive to the feedback signal and the other signal for deriving a control signal related to the difference between the feedback signal and the other signal; and controller means responsive to the control signal and operative for supplying an algorithmic output signal having a predetermined algorithmic relationship to the control signal; and wherein:

the determining means supplies the drive and clamp signals in response to the algorithmic output signal.

7. A resonant power supply as defined in claim 6 wherein the algorithmic relationship is established by comparing the value of the control signal occurring during the present half cycle with the values of a predetermined number of previous control signals.

8. A resonant power supply as defined in claim 6 wherein the algorithmic relationship is established by comparing the value of the control signal occurring during the present half cycle with the average of the values of a predetermined number of control signals occurring during the same predetermined number of previous half cycles.

9. A resonant power supply a defined in claim 8 wherein the average is obtained for a predetermined number of previous consecutively occurring half cycles.

10. A resonant power supply as defined in claim 6 wherein the algorithmic relationship is established by comparing the value of the control signal occurring during the present half cycle with the weighted average of the values of a predetermined number of control signals occurring during the same predetermined number of previous half cycles.

11. A resonant power supply as defined in claim 10 wherein the average is weighted to attribute greater significance to the value of each of the most recent control signals occurring during the predetermined number of half cycles.

12. A resonant power supply as defined in claim 11 wherein the weighted average is obtained from a predetermined number of previous consecutively occurring half cycles.

13. A resonant power supply as defined in claim 6 wherein the control signal has a level of magnitude related to the difference between the feedback signal and the other signal, the algorithmic relationship is established by the level of the control signal, and the algorithmic relationship at each level of the control signal creates a pattern of drive and clamp signals which alternate.

14. A resonant power supply as defined in claim 13 wherein the pattern achieves a maximum degree of alternation of drive and clamp signals to achieve the control effect represented by the control signal.

15. A resonant power supply as defined in claim 6 wherein the control signal has a level of magnitude related to the difference between the feedback signal and the other signal, the algorithmic relationship is established by a digital value of the level of the control signal, and the algorithmic relationship is related to the rate multiplication of the digital value.

16. A resonant power supply as defined in claim 6 wherein the algorithmic relationship establishes a predetermined pattern of drive and clamp signals and the predetermined pattern achieves a maximum degree of alternation to achieve the control effect represented by the control signal.

17. A resonant power supply as defined in claim 6 wherein:

the feedback means derives a first and a second feedback signal, the first feedback signal represents an electrical condition in the primary winding and the second feedback signal represents an electrical condition in the secondary winding; and the comparator means compares one of the first or second feedback signals with the other signal to obtain a difference signal and thereafter compares the difference signal with the other one of the first or second feedback signals to obtain the control signal.

18. A resonant power supply as defined in claim 17 wherein:

the first feedback signal represents the magnitude of current flowing in the primary winding of the transformer;

the second feedback signal represents the magnitude of voltage in the secondary winding of the transformer; and the other signal defines the magnitude of voltage to be supplied.

19. A resonant power supply as defined in claim 6 wherein the feedback means further comprises:

current sensing means connected to the primary winding for supplying a primary current signal corresponding to characteristics of the resonant current flowing in the primary winding;

current detector means responsive to the primary current signal for establishing a first level signal representative of the maximum current flowing during the positive half cycle and for establishing a second level signal representative of the maximum current flowing during the negative half cycle; and means for alternately supplying the first level signal and the second level signal as the feedback signal.

20. A resonant power supply as defined in claim 19 wherein the current detector means further comprises:

a positive sampling circuit responsive to the primary current signal for establishing a first half cycle signal representative of the maximum resonant current during one positive half cycle;

a negative sampling circuit responsive to the primary current signal for establishing a second half cycle signal representative of the maximum resonant current during one negative half cycle immediately following the one positive half cycle;

a first signal holding means for holding a signal applied thereto;

a second signal holding means for holding a signal applied thereto;

a first transfer means connected between the positive sampling circuit and the first signal holding means and operative for transferring the first half cycle signal to the first signal holding means, the signal held by the first signal holding means being the first level signal;

a first reset means connected to the positive sampling circuit for terminating the first half cycle signal after the first half cycle signal has been transferred to the first signal holding means;

a second transfer means connected between the negative sampling circuit and the second signal holding means for transferring the second half cycle signal to the second signal holding means, the signal held by the second signal holding means being the second level signal; and a second reset means connected to the negative sampling circuit for terminating the second half cycle signal after the second half cycle signal has been transferred to the second signal holding means.

21. A resonant power supply as defined in claim 20 wherein:

the first transfer means transfers the first half cycle signal during the one negative half cycle;

the second transfer means transfers the second half cycle signal during the next positive half cycle immediately following the one negative half cycle;

the first reset means terminates the first half cycle signal during the one negative half cycle; and the second reset switch means terminates the second half cycle signal during the next negative half cycle immediately following the one positive half cycle.

22. A resonant power supply as defined in claim 2 wherein:

the primary resonant circuit further includes a resonant capacitance which also functions as a storage capacitance; and the switch means further comprises a plurality of current switches arranged in a predetermined configuration to operatively connect the resonant primary circuit to a DC power delivery node and a DC power reference node; and in response to a drive signal:

the predetermined configuration of current switches operatively drives a current pulse from the delivery node to the reference node through the primary winding in a first direction and charges the storage capacitor, during one half cycle of resonant current; and the predetermined configuration of current switches operatively disconnects the resonant primary circuit from the delivery and reference nodes and drives a current pulse derived by discharging the storage capacitor through the primary winding in the opposite direction, during the other half cycle of resonant current.

23. A resonant power supply as defined in claim 22 wherein, in response to a clamp signal:

the predetermined configuration of current switches operatively disconnects the resonant primary circuit from the delivery and reference nodes and clamps to allow the natural resonant current to decay in a current path through the resonant primary circuit.

24. A resonant power supply as defined in claim 23 wherein:

the predetermined configuration of current switches allows either of two current switches to achieve clamping on each positive half cycle and allows either of two other switches to achieve clamping on the negative half cycle; and the determining means supplies the clamp signals alternately to the two current switches with each successive positive half cycle during which a clamping condition exists and alternately to the two other current switches on the negative half cycle during which a clamping condition exists, and the one and the other current switch which receive the clamp signal conduct to accomplish the clamping in response to the clamping signal.

25. A resonant power supply as defined in claim 24 wherein:

the determining means further includes alternating means for maintaining information describing the status of the previously supplied clamping signals during intervening drive conditions to resume supplying the alternating pattern of clamping signals with the next successive clamping condition.

26. A resonant power supply as defined in claim 22 wherein the predetermined configuration of current switches comprises:

a first, a second, a third and a fourth current switch connected in series in order between a DC power delivery node and a DC power reference node, the connection between the first and second current switches establishing an upper node which is connected to the resonant primary circuit the connection between the second and third current switches establishing a midpoint node, the connection between the third and forth current switches establishing a lower node which is connected to the resonant primary circuit, the resonant primary circuit extending substantially between the upper and lower nodes; and wherein, in response to a drive signal:

the second and third current switches are nonconductive, and the first and fourth current switches operatively drive a current pulse from the delivery node to the reference node through the primary winding in a first direction and charge the storage capacitor, during one half cycle of resonant current; and the first and fourth current switches are nonconductive to operatively disconnect the resonant primary circuit from the delivery and reference nodes, and the second and third current switches drive a current pulse derived by discharging the storage capacitor through the primary winding in the opposite direction, during the other half cycle of resonant current.

27. A resonant power supply as defined in claim 26 wherein, in response to a clamping signal:

one of the first or third current switches clamps on one half cycle and one of the second or fourth current switches clamps on the other half cycle, and the three current switches other than the one which clamps are nonconductive; and the one of the first or third current switches alternately clamps with the other one of the first or third current switches with successive occurrences of the one half cycle, and the one of the second or fourth current switches alternately clamps with the other one of the second or fourth current switches with successive occurrences of the other half cycle.

28. A resonant power supply as defined in claim 27 wherein:

the switch means further comprises a first capacitor connected between the delivery node and the midpoint node, a second capacitor connected between the midpoint node and the reference node; and the determining means further comprises selector means responsive to the voltage at the midpoint node, the selector means terminates the alternation in clamping between the first and third current switches during the one half cycle and terminates the alternation in clamping between the second and third current switches during the other half cycle, and instead selects the one of the first or third current switches during the one half cycle and the one of the second or fourth current switches during the other half cycle to clamp during clamping conditions which results in the clamped resonant current charging the first and second capacitors to maintain the voltage on the midpoint node within a predetermined range relative to the voltage between the delivery and reference nodes.

29. A resonant power supply as defined in claim 28 wherein:
the predetermined range is established relative to substantially one half of the voltage between the delivery and reference nodes; and
the selector means resumes the alternation in clamping between the first and third current switches and between the second and fourth current switches so long as the midpoint voltage is within the predetermined range.

30. A resonant power supply as defined in claim 2 wherein the switch means further comprises:
a plurality of current switches arranged in a predetermined configuration to operatively connect the resonant primary circuit to a DC power delivery node and a DC power reference node; and
current limiter means connected to the current switch and including means for sensing the current conducted by the current switch in response to a drive signal and for supplying a switch current signal related to the current sensed, means for deriving a set point signal representative of a predetermined maximum allowable characteristic of the current conducted by the current switch, comparator means for comparing the switch current signal and the set point signal and for supplying an output signal upon the switch current signal exceeding the set point signal, disabling means receptive of the output signal and operative for disabling the conduction of the current switch upon the existence of the output signal.

31. A resonant power supply as defined in claim 30 wherein the predetermined maximum characteristic is a maximum amount of current conducted by the current switch.

32. A resonant power supply as defined in claim 30 wherein the predetermined maximum characteristic is maximum rate of increase in current conducted by the current switch.

33. A resonant power supply as defined in claim 30 wherein:
the current limiter means further comprises delay means operative in response to the output signal for maintaining the disabled condition of the current switch for a predetermined time period after the occurrence of the output signal.

34. A resonant power supply as defined in claim 33 wherein the predetermined time period is greater than the time period of each cycle of the resonant current.

35. A resonant power supply as defined in claim 1 wherein the transformer further comprises:
a closed loop core having a center opening;
secondary windings formed as traces on a printed circuit board which extend through the center opening in the core; and
a primary winding formed as a sheet metallic conductor extending through the opening and encircling the core in at least one winding.

36. A method of supplying power using a transformer having a primary winding and a secondary winding, comprising:
connecting the primary winding in a resonant primary circuit;
oscillating a natural resonant current at a natural frequency in alternating positive and negative half cycles in the resonant primary circuit;
driving current pulses to the resonant primary circuit in phase with and substantially only during the full duration of selected positive and negative half cycles to increase the magnitude of the resonant current;
clamping the natural resonant current substantially only during the full duration of selected positive and negative half cycles to allow the resonant current decay in magnitude;
selecting one of the driving or clamping steps with each half cycle of resonant current to control the magnitude of the resonant current in the primary winding;
commencing and ending the selected one of the driving step or clamping step substantially at each zero magnitude of the natural resonant current; and
deriving the power supplied from the secondary winding.

37. A method of supplying power as defined in claim 36 further comprising:
determining a driving condition or a clamping condition for each positive and each negative half cycle on a half cycle by half cycle basis.

38. A method of supplying power as defined in claim 37 wherein:
determining the driving condition or the clamping condition during the half cycle immediately following the half cycle in which the condition existed; and
either driving the current pulses or clamping the resonant current during the half cycle immediately following the half cycle in which the determination was made.

39. A method of supplying power as defined in claim 38 wherein the step of determining the driving or clamping condition further comprises:
determining a zero magnitude of the resonant current;
determining a maximum magnitude of the resonant current during each positive and negative half cycle; and
responding to the determination of the zero magnitude and the maximum magnitude of the resonant current when determining the driving or clamping condition.

40. A method of supplying power as defined in claim 37 further comprising:
applying a voltage supplied by the secondary winding to an x-ray tube.

41. A method of supplying power as defined in claim 37 wherein the step of determining the driving or clamping condition further comprises:
deriving a feedback signal representative of an electrical condition in at least one of the primary or secondary windings;
supplying an other signal related to a desired level of power supplied from the power supply;
comparing the feedback signal and the other signal to derive a control signal related to the difference between the feedback signal and the other signal;
supplying a drive signal representative of a driving condition and supplying a clamp signal representative of a clamping condition in accordance with a predetermined algorithmic relationship directly related to the control signal;

driving current pulses in response to the drive signal; and clamping the resonant current in response to the clamp signal.

42. A method of supplying power as defined in claim 41 further comprising:

deriving the algorithmic relationship by steps including:

comparing the value of the control signal occurring during the present half cycle with the values of a predetermined number of control signals occurring during the same predetermined number of previous half cycles.

43. A method of supplying power as defined in claim 41 further comprising:

deriving the algorithmic relationship by steps including:

averaging the values of a predetermined number of control signals occurring during the same predetermined number of previous half cycles to obtain an average value; and comparing the value of the control signal occurring during the present half cycle with the average value.

44. A method of supplying power as defined in claim further comprising:

obtaining the average value from a predetermined number of previous consecutively occurring half cycles.

45. A method of supplying power as defined in claim 41 further comprising:

deriving the algorithmic relationship by steps including:

weighting the values of a predetermined number of control signals occurring during the same predetermined number of previous half cycles to obtain the same predetermined number of weighted control signal values;

averaging the weighted values of the predetermined number of weighted control signal values to obtain a weighted average value; and comparing the value of the control signal occurring during the present half cycle with the weighted average value.

46. A method of supplying power as defined in claim 45 further comprising:

attributing greater significance to the value of the most recent control signals to obtain the weighted average value.

47. A method of supplying power as defined in claim 46 further comprising:

obtaining the weighted average value from a predetermined number of previous consecutively occurring half cycles.

48. A method of supplying power as defined in claim 41 further comprising:

deriving the algorithmic relationship by steps including:

dividing the control signal into a plurality of different level values, each of the level values related to the difference in magnitude between the feedback signal and the other signal; and creating a different predetermined pattern of alternating drive and clamp signals in response to each level value of the control signal.

49. A method of supplying power as defined in claim further comprising:

creating each predetermined pattern to achieve a maximum degree of alternation of the drive and clamp signals.

50. A method of supplying power as defined in claim 41 further comprising:

deriving the algorithmic relationship by steps including:

creating a digital value of the control signal;

rate multiplying the digital value of the control signal to create a pattern of alternating drive and clamp signals in response to the digital value of the control signal.

51. A method of supplying power as defined in claim 41 further comprising:

selecting the algorithmic relationship to create a maximum degree of alternation of the drive and clamp signals.

52. A method of supplying power as defined in claim 41 wherein the step of determining the driving or clamping condition further comprises:

deriving a first feedback signal representing an electrical condition in the primary winding;

deriving a second feedback signal representing an electrical condition in the secondary winding;

comparing one of the first or second feedback signals with the other signal to obtain a difference signal; and thereafter comparing the difference signal with the other one of the first or second feedback signals to obtain the control signal.

53. A method of supplying power as defined in claim 52 wherein:

the first feedback signal represents the magnitude of current flowing in the primary winding of the transformer;

the second feedback signal represents the magnitude of voltage in the secondary winding of the transformer; and the other signal defines the magnitude of voltage to be supplied.

54. A method of supplying power as defined in claim 41 wherein the step of determining the driving or clamping condition further comprises:

sensing the resonant current flowing in the primary winding;

supplying a primary current signal corresponding to characteristics of the resonant current flowing in the primary winding;

establishing a first level signal representative of the maximum current flowing during the positive half cycle;

establishing a second level signal representative of the maximum current flowing during the negative half cycle; and alternately supplying the first level signal and the second level signal as the feedback signal.

55. A method of supplying power as defined in claim 54 further comprising:

sampling the primary current signal for one positive half cycle;

establishing a first half cycle signal representative of the maximum current sampled during the one positive half cycle;

sampling the primary current signal for one negative half cycle;

establishing a second half cycle signal representative of the maximum current sampled during the one negative half cycle immediately following the one positive half cycle;

holding the first half cycle signal as the first level signal;

terminating the first half cycle signal after the first level signal is held;

holding the second half cycle signal as the second level signal; and terminating the second half cycle signal after the second level signal is held.

56. A method of supplying power as defined in claim 55 wherein:

the first half cycle signal is held during the one negative half cycle;

the second half cycle signal is held during the next positive half cycle immediately following the one negative half cycle;

the first half cycle signal is terminated during the one negative half cycle; and the second half cycle signal is terminated during the next positive half cycle immediately following the one negative half cycle.

57. A method of supplying power as defined in claim 37 further comprising:

including a resonant capacitance which also functions as a storage capacitance in the resonant primary circuit;

connecting the resonant primary circuit to a DC power delivery node and to a DC power reference node;

driving a current pulse from the delivery node to the reference node through the primary winding in a first direction in response to a drive signal to charge the storage capacitor, during one half cycle of resonant current;

disconnecting the resonant primary circuit from the delivery and reference nodes, during the other half cycle or resonant current; and driving a current pulse derived by discharging the storage capacitor through the primary winding in the opposite direction in response to a drive signal, during the other half cycle of resonant current.

58. A method of supplying power as defined in claim 57 further comprising:

disconnecting the resonant primary circuit from the delivery and reference nodes and clamping the natural resonant current to decay in a current path through the resonant primary circuit in response to a clamp signal.

59. A method of supplying power as defined in claim 58 further comprising:

establishing a predetermined configuration of current switches which drives the current pulses and clamps the resonant current in which either of two current switches achieve clamping on each positive half cycle and either of two other switches achieve clamping on the negative half cycle;

supplying the clamp signals to alternately opposite ones of the two current switches on the positive half cycle and to alternately opposite ones of the two other current switches on the negative half cycle; and conducting through the one and the other current switch which receive the clamp signal to accomplish the clamping in response to the clamping signal.

60. A method of supplying power as defined in claim 59 wherein the step of determining the driving or clamping condition further comprises:

maintaining information describing the alternative status of the previously supplied clamping signals during intervening drive conditions; and resuming supplying the alternating clamping signals with the next occurring clamping condition.

61. A method of supplying power as defined in claim 37 further comprising:

including a resonant capacitance which also functions as a storage capacitance in the resonant primary circuit;

establishing a predetermined configuration of current switches in which a first, a second, a third and a fourth current switch are connected in series in order between the delivery node and the reference node, the connection between the first and second current switches establishing an upper node which is connected to the resonant primary circuit, the connection between the second and third current switches establishing a midpoint node, the connection between the third and forth current switches establishing a lower node which is connected to the resonant primary circuit, the resonant primary circuit extending substantially between the upper and lower nodes;

rendering the first and fourth current switches conductive to drive a current pulse from the delivery node to the reference node through the primary winding in a first direction and charging the storage capacitor during one half cycle of resonant current;

rendering the first and fourth current switches nonconductive to disconnect the resonant primary circuit from the delivery and reference nodes; and rendering the second and third current switches conductive to drive a current pulse obtained by discharging the storage capacitor through the primary winding in the opposite direction by operation of the second and third current switches during the other half cycle of resonant current.

62. A method of supplying power as defined in claim 61 further comprising, in response to a clamping signal:

clamping one of the first or third current switches on one half cycle and clamping one of the second or fourth current switches clamps on the other half cycle;

alternating the conduction of one of the first or third current switches with the other one of the first or third current switches with successive occurrences of the one half cycle;

alternating the conduction of one of the second or fourth current switches with the other one of the second or fourth current switches with successive occurrences of the other half cycle; and rendering nonconductive the three current switches other than the one which is clamped.

63. A method of supplying power as defined in claim 62 further comprising:

connecting a first capacitor between the delivery node and the midpoint node;

connecting a second capacitor between the midpoint node and the reference node;

creating a voltage at the midpoint node by charging the first and second capacitors with clamped resonant current during the clamping condition;

sensing the voltage at the midpoint node;

terminating the alternation in clamping between the first and third current switches during the one half cycle and terminating the alternation in clamping between the second and third current switches during the other half cycle; and clamping a selected one of the first or third current switches during the one half cycle and clamping a selected one of the second or fourth current switches during the other half cycle which results in charging the first and second capacitors with clamped resonant current to maintain the voltage on the midpoint node within a predetermined range relative to the voltage between the delivery and reference nodes.

64. A method of supplying power as defined in claim 63 further comprising:

establishing the predetermined range relative to substantially one half of the voltage between the delivery and reference nodes; and resuming the alternation in clamping between the first and third current switches and between the second and fourth current switches while the midpoint voltage is within the predetermined range.

65. A method of supplying power as defined in claim 37 further comprising:

arranging a plurality of current switches in a predetermined configuration to operatively connect the resonant primary circuit to a DC power delivery node and a DC power reference node;

sensing the current conducted by each current switch in response to a drive signal and supplying a switch current signal related to the current sensed;

deriving a set point signal representative of a predetermined maximum allowable characteristic of the current conducted by the current switch;

comparing the switch current signal and the set point signal and supplying an output signal upon the switch current signal exceeding the set point signal; and disabling the conduction of the current switch upon the existence of the output signal.

66. A method of supplying power as defined in claim 65 wherein the predetermined maximum characteristic is a maximum amount of current conducted by the current switch.

67. A method of supplying power as defined in claim 65 wherein the predetermined maximum characteristic is maximum rate of increase in current conducted by the current switch.

68. A method of supplying power as defined in claim 65 further comprising:

maintaining the disabled condition of the current switch for a predetermined time period after the occurrence of the output signal.

69. A method of supplying power as defined in claim 68 wherein the predetermined time period is greater than the time period of each cycle of the resonant current.

* * * * *